(12) United States Patent
Geiling et al.

(10) Patent No.: US 12,525,845 B2
(45) Date of Patent: Jan. 13, 2026

(54) ELECTRIC MOTOR HAVING A SWITCHING UNIT AND A CONTACT ADAPTER WITH A PLUG CONNECTION

(71) Applicant: Brose Fahrzeugteile SE & Co. Kommanditgesellschaft, Wuerzburg, Wuerzburg (DE)

(72) Inventors: Christian Geiling, Reichenberg (DE); Peter Hauck, Gerbrunn (DE); Moritz Obendorfer, Wuerzburg (DE); Patrick Thurmann, Wuerzburg (DE)

(73) Assignee: Brose Fahrzeugteile SE & Co. Kommanditgesellschaft, Bamberg, Wuerzburg (DE)

( * ) Notice: Subject to any disclaimer, the term of this patent is extended or adjusted under 35 U.S.C. 154(b) by 271 days.

(21) Appl. No.: 18/208,093

(22) Filed: Jun. 9, 2023

(65) Prior Publication Data
US 2023/0318397 A1    Oct. 5, 2023

Related U.S. Application Data

(63) Continuation of application No. PCT/DE2021/100990, filed on Dec. 9, 2021.

(30) Foreign Application Priority Data

| Dec. 9, 2020 | (DE) | 10 2020 215 587.9 |
| Dec. 9, 2020 | (DE) | 10 2020 215 588.7 |
| Feb. 1, 2021 | (DE) | 10 2021 200 885.2 |

(51) Int. Cl.
*H02K 3/52* (2006.01)
*B60T 13/74* (2006.01)
(Continued)

(52) U.S. Cl.
CPC .............. *H02K 5/225* (2013.01); *H02K 3/522* (2013.01); *H02K 5/15* (2013.01); *B60T 13/74* (2013.01);
(Continued)

(58) Field of Classification Search
CPC ............ H02K 3/50; H02K 3/52; H02K 3/521; H02K 3/522; H02K 5/15; H02K 5/22;
(Continued)

(56) References Cited

U.S. PATENT DOCUMENTS

| 2015/0229178 A1 | 8/2015 | Murakami et al. |
| 2017/0237312 A1 | 8/2017 | Stewart et al. |

(Continued)

FOREIGN PATENT DOCUMENTS

| DE | 19849669 A1 | 5/2000 |
| DE | 102015200086 A1 | 7/2016 |

(Continued)

OTHER PUBLICATIONS

International Search Report dated May 30, 2022 in corresponding application PCT/DE2021/100990.

*Primary Examiner* — Eric Johnson
(74) *Attorney, Agent, or Firm* — Muncy, Geissler, Olds & Lowe, P.C.

(57) ABSTRACT

An electric motor of a motor vehicle, in particular an auxiliary unit, with a stator having a stator winding as well as with a rotor as well as with a switching unit and with a contact adapter for an electric motor connection. The stator and the rotor are arranged concentrically to a motor axis in a motor housing, which is closed with a bearing plate arranged perpendicular to the motor axis. The switching unit is placed on the stator and electrically contacted by the stator winding, and the contact adapter is connected to the switching unit and in electrical contact with it. A plug connection (Continued)

of the contact adapter is arranged in an opening of the bearing plate. A method for the mounting of an electric motor as well as an auxiliary unit of a motor vehicle are also provided.

10 Claims, 13 Drawing Sheets

(51) Int. Cl.
    *B62D 5/04*     (2006.01)
    *H02K 5/15*     (2006.01)
    *H02K 5/22*     (2006.01)

(52) U.S. Cl.
    CPC ........ *B62D 5/0403* (2013.01); *H02K 2203/09* (2013.01)

(58) Field of Classification Search
    CPC . H02K 5/225; H02K 2203/03; H02K 2203/09
    See application file for complete search history.

(56) References Cited

U.S. PATENT DOCUMENTS

| | | |
|---|---|---|
| 2018/0316239 A1 | 11/2018 | Ogawa et al. |
| 2019/0305625 A1 | 10/2019 | Mao et al. |
| 2020/0067367 A1* | 2/2020 | Braun .................... H02K 15/32 |
| 2020/0177045 A1* | 6/2020 | Kizu ....................... H02K 5/225 |
| 2020/0195083 A1 | 6/2020 | Ueno et al. |
| 2020/0313501 A1* | 10/2020 | Asahi ....................... H02K 5/22 |

FOREIGN PATENT DOCUMENTS

| | | |
|---|---|---|
| DE | 102017205532 A1 | 10/2018 |
| DE | 102019200616 A1 | 7/2020 |
| DE | 102019202859 A1 | 9/2020 |
| EP | 1307370 B1 | 6/2004 |
| WO | 0079144 A1 | 12/2000 |

* cited by examiner

ELECTRIC MOTOR HAVING A SWITCHING UNIT AND A CONTACT ADAPTER WITH A PLUG CONNECTION

This nonprovisional application is a continuation of International Application No. PCT/DE2021/100990, which was filed on Dec. 9, 2021, and which claims priority to German Patent Application No. 10 2020 215 587.9, which was filed in Germany on Dec. 9, 2020, and to German Patent Application No. 10 2020 215 588.7, which was filed in Germany on Dec. 9, 2020, and to German Patent Application 10 2021 200 885.2, which was filed in Germany on Feb. 1, 2021, and which are all herein incorporated by reference.

BACKGROUND OF THE INVENTION

Field of the Invention

The present invention relates to an electric motor of a motor vehicle as well as to a method for the mounting of an electric motor and an auxiliary unit of a motor vehicle having an electric motor. The electric motor has a stator, a rotor as well as a switching unit and a contact adapter.

Description of the Background Art

Motor vehicles, such as passenger cars, have a large number of auxiliary units which are not directly used for the propulsion of the motor vehicle. Such auxiliary units are required, for example, for the operation of the main propulsion system, or are intended to provide or increase comfort for the user of the motor vehicle. Such an auxiliary unit is, for example, an electromotive adjustment drive, such as an electromotive window lifting mechanism. Alternatively, the auxiliary unit, for example, is an electromotive refrigerant compressor, which is in particular a component of a refrigerant circuit of the motor vehicle.

In another alternative, the electric motor is a component of the braking system of the motor vehicle. Here, for example, the electric motor is a component of an anti-lock braking system, an anti-slip control system or an electromotive-actuated brake force distribution. However, it is also possible to use the electric motor in a braking force generator. In particular, a hydraulic pump is operated via the electric motor, so that the pressure in the brake fluid system is increased. The electric motor is actuated via electrical signals and the braking force generator is mechanically released by a foot pedal or other input devices. Therefore, the electric motor can be operated independently of an actuation or other input from a user. Consequently, it is possible to brake the motor vehicle via the braking force generator, even if a user is no longer able to do so in an emergency situation.

To ensure that wear is as low as possible, the electric motor is usually designed as a brushless direct current motor (BLDC). In this case, the electric motor has a rotor that includes several permanent magnets, and which is non-rotatably attached to a rotor shaft. The rotor shaft is rotatably mounted about a rotor axis via one or more bearings, with each bearing being mounted on a respective bearing plate. The stator has several electrical coils which are electrically connected to three phases of a stator winding via a switching unit mounted on the stator, which is also called an interconnect ring. In this case, the individual phase connections are offset by 120° relative to the rotor axis, and with these a connection is usually electrically contacted, which is guided through a respective opening of the bearing plate.

SUMMARY OF THE INVENTION

It is therefore an object of the present invention to provide a particularly suitable electric motor of a motor vehicle as well as a particularly suitable method for mounting an electric motor and a particularly suitable auxiliary unit of a motor vehicle, wherein advantageously rejects are reduced and/or mounting is simplified.

The electric motor is a component of a motor vehicle. For this purpose, the electric motor is suitable, in particular provided and configured. In other words, the electric motor is normally mounted on other components of the motor vehicle. For this purpose, the electric motor is suitable, in particular provided and configured. In particular, the motor vehicle is land-based and preferably multi-lane. In this case, it is suitably possible to position the motor vehicle essentially freely, for example on an appropriate roadway. In particular, the motor vehicle has corresponding wheels for this purpose. In summary, essentially irrespective of other circumstances, it is preferably possible to use the motor vehicle on land. In other words, the motor vehicle is suitably not rail guided. Preferably, the motor vehicle is a passenger car or a utility vehicle, such as a truck or bus.

For example, the electric motor can be a component of a main drive of the motor vehicle and thus serves the (direct) propulsion of the motor vehicle. However, particularly preferably, the electric motor is a component of an auxiliary unit of the motor vehicle. In its intended use, the auxiliary unit does not directly serve to propel the motor vehicle and therefore does not constitute a main drive of the motor vehicle. The electric motor therefore preferably has a nominal or maximum power between 100 W and 1000 W, preferably between 300 W and 700 W and, for example, between 400 W and 500 W. For example, the auxiliary unit is used to operate the main drive or to provide the functions required for the operation of the motor vehicle that do not directly serve to propel the motor vehicle. Alternatively, the auxiliary unit provides an increase in comfort or comfort functions.

The auxiliary unit can be, for example, an electromotive adjustment drive, such as an electromotive window lifting mechanism. Alternatively, the auxiliary unit is, for example, an electromotive refrigerant compressor, which is, in particular, a component of a refrigerant circuit of the motor vehicle. In another alternative, the auxiliary unit is an electromotive pump, such as a water pump. Suitably, the electromotive pump is a lubricant pump, such as an engine oil pump or a transmission oil pump. In this case, for example, a pump wheel is driven via the electric motor, which is adapted to the liquid to be pumped. In another alternative, the electric motor is a component of a fan, such as a radiator fan or a blower, which thus constitute the respective auxiliary unit. In an alternative, the auxiliary unit is a steering support, and via the electric motor, in particular, a steering rod is driven or at least a steering angle of steerable wheels of the motor vehicle is adjusted via the electric motor or supported thereby.

The auxiliary unit can be a braking system or part of the braking system of the motor vehicle. In this case, the electric motor is, for example, a component of an anti-lock braking system, an anti-slip control system or an electromotive-actuated brake force distribution. Particularly preferably, the auxiliary unit is a braking force generator. This is preferably designed electro-hydraulically, wherein in particular a hydraulic pump is operated and/or any valves are actuated via the electric motor. Alternatively, a working piston is moved via the electric motor. The working piston is in particular, arranged in a pumping chamber in which a brake fluid is present during operation. If the working piston is moved linearly in the pumping chamber, the brake fluid is pushed out of the pumping chamber or sucked in, depending on the direction of movement. Preferably, any brake pistons of the brakes of a brake system of the motor vehicle are hydraulically connected to the pumping chamber, so that when the brake fluid is pressed from the pumping chamber, the brakes are actuated.

For example, an input rod is attached to the working piston, which may be expediently provided with a thread on the circumferential side, at least in sections, on which an internally toothed drive gear is placed. Via the input rod and the drive gear, a kind of spindle is formed. The drive gear is conveniently driven via the electric motor, for example directly or preferably via a gearbox. When the electric motor is energized, force is thus applied to the input rod via the drive gear and consequently also to the working piston.

The braking force generator can comprise a sensor via which an actuation of a foot pedal acting as a brake pedal is detected during operation. Depending on this, the electric motor is energized. There is no mechanical connection between the foot pedal and the working piston, and the foot pedal, for example, is not part of the braking force generator. Suitably, the braking force generator comprises a control unit via which the sensor is read out and the current supply to the electric motor is adjusted. In a further development, the electric motor is energized via the control unit independently of an actual actuation of the foot pedal, preferably in response to a request provided, which is transmitted in particular via any bus system. The request is made, for example, by an assistance system of the motor vehicle or an on-board computer of the motor vehicle. In particular, the request is made depending on certain driving situations, for example by an emergency brake assistant. Alternatively or in combination with this, the motor vehicle is designed to be partially or fully autonomous, so that movement takes place independently of user control. The request is made in particular by a so-called automatic pilot.

The braking force generator can be designed as an electromechanical brake booster. For example, the input rod is connected to the foot pedal via a mechanism so that it is adjusted directly when the foot pedal is actuated. In this case, the electric motor is used in particular to support the movement of the foot pedal during normal operation, which is why the force to be applied by a user is reduced. Alternatively or in combination with this, for example, the force to be applied is adjusted so that, for example, it is always constant, regardless of the current driving situation. However, it is also preferable to move the working piston independently of the actuation of the foot pedal, namely by energizing the electric motor accordingly. Consequently, the field of application is expanded.

In particular, the electric motor is designed as a brushless direct current motor (BLDC) and/or synchronous motor. The electric motor has a stator and the rotor arranged concentrically to a motor axis in a motor housing. The motor housing is closed via a bearing plate, which is disposed perpendicular to the motor axis. For example, the rotor comprises a laminate stack in which permanent magnets are embedded or on which they are supported. Suitably, the rotor comprises a rotor shaft, which is preferably arranged along the motor axis, which is also referred to as the rotor axis. The rotor shaft, or at least the rotor, is suitably mounted in a rotatable manner via one or more bearings, at least one of the bearings being conveniently connected to the bearing plate. In this case, a part of the rotor shaft of the rotor projects beyond the bearing plate, so that this part is arranged outside the motor housing, or the rotor shaft, for example, is not part of the rotor. If the other bearing is present, it is preferably assigned to another bearing plate, so that the motor housing is closed on both sides via one of the bearing plates. In other words, the motor housing is at least partially hollow cylindrical. Alternatively, the motor housing is pot-shaped, and one of the bearings is fastened to a pot bottom of the motor housing, which thus takes on the role of the one bearing plate. With such a motor housing, tightness is increased and mounting is possible in a short time. Alignment is also simplified. Since the rotor and stator are located in the motor housing, they are protected from environmental influences via the motor housing and the bearing plate, so that robustness is enhanced. Preferably, the motor housing closed with the bearing plate is designed to be fluid-tight.

For example, the stator can surround the rotor on the circumferential side, so that the electric motor is designed as an inner rotor. Suitably, the stator is at least partly hollow cylindrical. The stator has a stator winding. Preferably, the stator winding comprises several electrical coils, which are preferably made of an enameled wire, for example, an enameled aluminum wire or an enameled copper wire. Preferably, two of the electrical coils are formed via a common wire and thus via a wire section, so that the respective two electrical coils are electrically connected in series. In particular, the stator has between six such electrical coils and twenty electrical coils and, suitably, twelve electrical coils. Conveniently, each of the electrical coils, which is also referred to as merely a coil, is wound on an assigned stator tooth. The stator teeth are preferably formed via a common laminate stack of the stator. Via the electrical coils, an electromagnet is formed in each case, or the respective electromagnet at least additionally includes the respective stator tooth. In summary, several electromagnets are formed via the stator winding, at least in part.

The electric motor also can include a switching unit that electrically contacts the stator winding. For example, the switching unit is welded or soldered to the stator winding. Alternatively, the switching unit has, for example, a hook or the like in which at least part of the possible enameled wire forming the stator winding is inserted. Via the switching unit, the individual electrical coils of the stator winding are preferably interconnected. Preferably, the electrical coils are connected in several phases, each of the (electrical) phases suitably being assigned the same number of electrical coils. In this case, if one of the phases is energized during operation, all electrical coils of this phase are energized. In particular, the electrical coils of the same phase are electrically connected in parallel or in series. For example, the stator can include two such phases, and the electric motor is thus two-phase, or preferably three such phases, so that the electric motor is three-phase. The phases themselves are contacted, for example, with each other to form a delta or star circuit. In other words, the stator winding is thus designed in the manner of a delta or star connection.

For the interconnection of the individual electrical coils, the switching unit may have one or more separate busbars which, when mounted, are contacted, in particular, with corresponding ends of the respective electrical coil. In this case, for example, these only approximately rest against each other or are attached to each other, preferably via welding or brazing. Suitably, the individual busbars of the switching unit are held on a body of the switching unit, which is preferably made of a plastic. In this way, an electrical short circuit between the individual busbars is avoided.

The switching unit can be mounted on the stator. As a result, the switching unit is also inside the motor housing and is therefore protected by it. In particular, the switching unit is located at one end of the stator. Preferably, the switching unit is placed on a front side of the stator and is thus offset along the motor axis relative to the stator. Conveniently, the switching unit, preferably the possible body, is mechanically directly connected to the stator, so that stability and robustness are increased. The switching unit is suitably arranged congruently with the stator, so that space requirements are reduced. Preferably, the switching unit is ring-shaped and/or perpendicular to the motor shaft, which is why space requirements are further reduced. Conveniently, the switching unit is attached to the stator, for example, via glue, clips or screws. Alternatively, it can be fastened via clamping. In another alternative, the switching unit only rests loosely on the stator.

The electric motor further can include a contact adapter for an electrical motor connection. In other words, the contact adapter is suitable, expediently provided and configured, to be electrically contacted by the motor connection so that the electric motor can be supplied with power via the motor connection. In other words, the contact adapter is used to accommodate the electrical motor connection as well as for electrical contact with it. For example, the (electrical) motor connection is a component of a possible control system, in particular of any auxiliary unit, or the motor connection is a component of the electric motor, in particular the electronics of the electric motor. Particularly preferred, an electrical bridge circuit is in electrical contact with the motor connection.

The contact adapter is connected to the switching unit and is thus stabilized via it. In other words, the contact adapter is held via the switching unit, so that in particular it is prevented from detaching. Thus, the position of the contact adapter is at least partially specified via the switching unit. For example, the contact adapter is attached to the switching unit. Furthermore, the contact adapter is in electrical contact with the switching unit and preferably, via the switching unit, with the stator winding. Particularly preferably, the contact adapter comprises one or more plug contacts, each of the possible phases of the stator winding being suitably assigned to at least one of the plug contacts and thus electrically contacted.

The contact adapter can also include a plug connection, which conveniently includes the possible plug contacts. The plug connection is used in particular for the mechanical connection with the motor connection. Preferably, the plug connection is designed accordingly for this purpose. The plug connection is arranged in an opening of the bearing plate so that its position is predetermined via the opening in the bearing plate. For example, a gap is formed between the edge of the opening and the plug connection, or, for example, these are force-fit against each other on the circumferential side, so that fluid tightness is given despite the opening. Alternatively, for example, a seal is arranged in between. In particular, the plug connection is arranged parallel to the motor axis, in particular, any plug contacts.

Due to the arrangement of the plug connection in the opening of the bearing plate, electrical contacting of the stator winding is only possible after the bearing plate has been attached to the motor housing, so that the electric motor can at least be partially prefabricated. In this way, production is simplified. Due to the arrangement of the plug connection parallel to the motor axis, it is possible to connect the motor connection via a movement parallel to the motor axis, which is why contacting via the motor housing is not hindered. In this way, the mounting of the electric motor is further simplified.

Furthermore, the position of the plug connection can be specified comparatively precisely via the opening, so that electric contacting with the motor connection, which is a component of the electronics, for example, and/or disposed on a printed circuit board, is always carried out, regardless of the selected manufacturing tolerances when the electric motor is created. It is only necessary to select low manufacturing tolerances in the bearing plate opening, so that manufacturing costs are reduced and production is also simplified. In addition, rejects are reduced in this way. Furthermore, it is possible to use the electric motor in different areas of application or with different manufacturers of motor connections. In this case, only a replacement of the contact adapter is required. Otherwise, the same parts can be used, which is why manufacturing costs are reduced.

In particular, the plug connection can be electrically contacted by each of the possible electrical phases of the stator winding. In this way, it is possible to design the bearing plate closed, with the exception of the opening and an additional opening for the possible rotor shaft, so that tightness and robustness are increased. Furthermore, electrical contacting is simplified, and it is possible, for example, to arrange any electronics that include the motor connection offset relative to the motor axis, which is why the required installation space is reduced. Particularly preferably, the plug connection is offset relative to the motor axis and is, for example, not symmetrical relative to a radial straight line relative to the motor axis. In this way, the use of the available space is further improved.

For example, the stator or, preferably, the switching unit can have an alignment section within the motor housing when mounted. In this way, it is ensured that the contact adapter connected to the switching unit is actually arranged within the opening, so that rejects are further reduced. For example, the stator or, more preferably, the switching unit has a hole or other opening located parallel to the motor axis, but offset from it, which is used to temporarily hold the tool via which the positioning takes place. For this purpose, the tool preferably has a corresponding mandrel or the like for insertion into the hole, so that the switching unit and thus also the stator are aligned. In this case, the tool, suitably the mandrel, is conveniently located in the hole of the switching unit or stator via a clearance fit. In this way, on the one hand, comparatively precise positioning is achieved, while on the other hand, the force required is reduced. In addition, this prevents damage to the switching unit or stator because less force is applied.

The tool preferably can have another mandrel or the like which interacts with corresponding receptacles of the motor housing, in particular possible holes, such as fastening holes, which are used to accommodate screws or the like intended for fastening the motor housing to a component to be driven. In summary, the tool engages both in the motor housing and the switching unit or the stator, and these are consequently aligned accordingly to each other, which simplifies mounting.

For example, the plug connection can be rigidly attached to the switching unit. Particularly preferably, however, the plug connection is floatingly mounted on the switching unit. In other words, at least a slight movement of the plug connection relative to the switching unit is possible, whereby nevertheless, the former is connected to the switching unit and electrically contacted by it, preferably via other components of the contact adapter. Due to the floating mounting, tolerance compensation is possible, so that it is always possible to arrange the plug connection in the opening, while the width of a slot between the plug connection and the edge of the opening can still be chosen to be comparatively small.

For example, the switching unit in the area of the plug connection can be designed to be smooth. In this way, the movement of the plug connection is not hindered due to the floating mounting via the switching unit. Also, production is simplified. Particularly preferably, however, the switching unit includes a recess within which the plug connection is arranged with play. In this case, the recess is used to specify the extent to which the plug connection is floatingly mounted. In other words, via the recess, the adjustment range for the floating mounting is limited, which is why robustness is given during mounting, consequently simplifying the latter. Consequently, the recess is used for at least temporary positioning of the plug connection, and via this it is ensured that twisting of the plug connection with regard to an axis running parallel to the motor axis does not occur or is at least limited. Therefore, insertion of the plug connection into the opening of the bearing plate during mounting is simplified. In summary, the recess ensures that the plug connection is not twisted or tilted, or that this is at least reduced to a manageable level.

Alternatively or in combination with this, the plug connection can have a peg running parallel to the motor axis, which is inserted with play within a hole of the switching unit. Thus, via the hole a movement of the peg and thus also the movement of the plug connection with regard to the switching unit is specified. In this case, the peg also prevents or at least limits tilting of the plug connection. The peg, which is designed in the manner of a pin, is conveniently conical at its free end, so that it is easier to insert it into the hole during mounting. The hole, for example, is continuous or, for example, blind hole-like. At the very least, however, the hole also runs parallel to the motor axis, which on the one hand simplifies production. On the other hand, it makes it easier to arrange the peg in the hole.

For example, the plug connection can be attached to the switching unit via a cable or the like. Alternatively, the plug connection is attached directly to the switching unit, or, for example, an electrical contact is made via a sliding contact. In this way, comparatively comprehensive floating mounting is also possible. Particularly preferable, however, the contact adapter comprises a contact arm which is connected to the plug connection. For example, the contact arm or at least a part of it is molded to the plug connection and is therefore at least partially one-piece with part of the plug connection. In this way, robustness is increased and mounting simplified. In particular, the contact arm is arranged perpendicular to the motor axis.

The contact arm can be designed to be elastically deformable and/or flexible. In addition, the contact arm is attached to the switching unit, especially rigidly. Subsequently, by deforming the contact arm, the floating mounting of the plug connection takes place, wherein it is nevertheless connected to the switching unit via the contact arm in a captive manner. In particular, an area of the contact arm spaced from the plug connection is attached to the switching unit, which is why the floating mounting is improved.

In particular, the contact arm can have a curved, e.g., circular arc-shaped, adapter section, which is arranged between the connection to the switching unit and the connection to the plug connection. Preferably, in this case, the center of the circular arc is on the motor axis, so that available space is used comparatively efficiently and mounting is simplified.

Preferably, the contact adapter can have several such contact arms, so that stability is increased. Suitably, the plug connection includes the plug contacts, wherein it is convenient to assign one of the plug contacts to each of the contact arms. Particularly preferably, each contact arm has an electrically conductive area, which in particular makes electrical contact with the respective plug contact and, for example, is connected to it. In addition, each contact arm particularly preferably includes electrical insulation via which the respective electrically conductive area is at least partially surrounded, and which is prepared, for example, via a plastic overmolding. Preferably, the electrical insulation of the respective contact arm is one-piece with a housing of the plug connection, via which the plug contacts are held. In this way, mounting of the motor connection is simplified. It also prevents an electrical short circuit of the plug contacts via the bearing plate. The plug contacts are designed in particular as so-called "male" plugs. The motor connection preferably has corresponding sockets, within which the respective plug contact is at least partially inserted and electrically contacted during mounting.

Preferably, the contact adapter can be in electrical contact with the switching unit. In this case, the contact adapter conveniently has a connection lug located at the ends of the contact arm facing away from the plug connection. This is conveniently contacted via brazing with a corresponding connection element of the switching unit. In this way, robustness is increased, wherein the cost of manufacturing the electrical contact is reduced. Alternatively, the connection element and the connection lug are welded together. In another alternative, the connection lug and the connection element are plugged into each other, so that no further aids are required to make the electrical contact. Suitably, the connection lug is created via the electrically conductive area/part of the contact arm, in particular a busbar, and the connection lug is preferably located outside the insulation and is conveniently the only part of the electrically conductive area/part of the contact arm which is located outside the respective insulation. The connection element of the switching unit is formed, for example, via a part of the stator winding, which, for example, protrudes through the possible body of the switching unit and is thus also assigned to it. Preferably, however, the connection element is formed via at least part of one of the possible busbars, so that robustness is increased. This also results in mechanical stabilization of the plug connection via the contact arm via the connection element, so that robustness is increased, wherein the number of required components is reduced.

For example, the opening can be comparatively large, so that even with large manufacturing tolerances it is possible to position the plug connection within the opening. However, the contact adapter particularly preferably has a positioner for positioning the plug connection in the opening. In other words, the positioner can be used for positioning and, preferably, for aligning the plug connection in the opening. Due to the positioner, a selection of comparatively large manufacturing tolerances is also possible for the individual components of the electric motor, while still ensuring that the plug connection is positioned within the opening. In this case, it is only necessary to provide comparatively low manufacturing tolerances for the positioner.

Conveniently, the plug connection can be floatingly mounted and/or the contact arm is present. In this case, for example, due to the positioner, the contact arm(s) is/are deformed during mounting, wherein the connection of the contact adapter to the switching unit is not damaged. Conveniently, electrical contact is also retained.

For example, the positioner can includes a peg or the like which engages in or locks into a corresponding contour of the bearing plate. Particularly preferably, however, the positioner can comprise crush ribs molded on the outside of the plug connection and running parallel to the motor axis. These are also positioned inside the opening, wherein the plug connection in the opening is aligned via the crush ribs. For this purpose, the crush ribs are expediently mechanically placed directly on the edge of the opening. Here, for example, a partial deformation of the crush ribs occurs, in particular when comparatively high manufacturing tolerances prevail. Due to the crush ribs, damage to the plug connection is avoided. Preferably, the crush ribs are conical or flattened at the end, especially at the end facing away from the switching unit. As a result, insertion into the opening is simplified, while still maintaining comparatively accurate positioning of the plug connection within the opening. In summary, due to the mechanical contact of the crush ribs with the edge of the opening, the plug connection is positioned, wherein, for example, the crush ribs are partially deformed. At the very least, however, the positioning/alignment of the plug connection is carried out.

Suitably, the crush ribs can be designed in such a way that when the plug connection is inserted into the opening parallel to the motor axis, the crush ribs successively come into mechanical contact with the edge of the opening, at least if an exact alignment already prevails. For this purpose, the crush ribs are designed in such a way that after completion of insertion, they have a different protrusion parallel to the motor axis beyond the edge. In other words, the crush ribs have a different height parallel to the motor axle beyond the edge. Suitably, the width of the crush ribs, i.e., their extension perpendicular to the motor axis, is equal to or at least constant after the possible conical/flattened section. Subsequently, the plug connection is first aligned in one dimension via one of the crush ribs and then aligned in another dimension via another crush rib, so that on the one hand tilting is avoided. On the other hand, the force required to insert the plug connection into the opening is reduced.

For example, the contact adapter can comprise two or more such crush ribs. Suitably, the positioner can have three corresponding crush ribs. Particularly preferably, the crush ribs are designed in such a way that alignment is made relative to the motor axis, first in the tangential direction, then in the radial direction and preferably subsequently in the radial and tangential direction.

Preferably, the positioner can also have other crush ribs, wherein some of the crush ribs are designed in such a way that they come into mechanical contact with the edge of the opening at the same time. In other words, at least one group has been formed in which the crush ribs essentially simultaneously come into contact with the edge of the opening during insertion, so that tilting of the plug connection due to a one-sided force exertion is avoided. However, there is still at least one crush rib in which mechanical contact with the edge takes place before or not until after insertion.

Particularly preferably, the plug connection includes a plug-in receptacle that is located on the side facing away from the switching unit and runs parallel to the motor axis. The plug-in socket, which is designed in particular as a hole or a bore, is used for the temporary reception of a positioning tool and is suitable for this purpose, in particular provided and configured. In particular, the plug-in receptacle is no longer used in the mounted state, i.e., after completion of the manufacture or mounting of the electric motor, and remains, for example, available. The plug-in receptacle is suitably arranged between the possible plug contacts, so that available space is used comparatively efficiently. For example, the plug-in receptacle, which serves as a positioning hole, is designed to be continuous or preferably blind hole-like, so that when the positioning tool is held, damage to the switching unit (positioned underneath) is avoided.

For mounting, in particular, the positioning tool is first guided through the opening of the bearing plate into the plug-in receptacle so that the plug connection is suitably aligned relative to the opening. Following this, the bearing plate is moved in relation to the positioning tool and the plug connection so that the plug connection is passed through the opening. By contrast, the arrangement and position of the plug connection relative to the positioning tool are conveniently not changed. Due to the positioning tool, it is impossible for the plug connection to get snagged with the edge of the opening, and tilting of the plug connection is also avoided. In particular, the positioning tool is designed in the manner of a pin and preferably conical on the free-end side, so that insertion into the plug-in receptacle is simplified. Alternatively or in combination with this, the plug-in receptacle is widened on the opening side. After the positioning of the plug connection within the opening is completed, the positioning tool is removed in particular. Thus, it can be reused in a subsequent mounting process. Preferably, the positioner for positioning the plug connection is available, for example, as crush ribs. In this case, a rough positioning is carried out via the positioning tool, wherein the crush ribs are used to carry out the final positioning.

The method can be used to mount an electric motor of a motor vehicle. The electric motor comprises a stator having a stator winding and a rotor as well as a switching unit and a contact adapter for an electrical motor connection. The stator and the rotor are arranged concentrically to a motor axis in a motor housing which is closed with a bearing plate located perpendicular to the motor axis. The switching unit is mounted on the stator and in electrical contact with the stator winding, wherein the contact adapter is connected to the switching unit and in electrical contact with it. A plug connection of the contact adapter is arranged in an opening of the bearing plate.

According to the method, i.e., during or for mounting the electric motor, the switching unit is first placed on the stator and electrically contacted by the stator winding. For this purpose, for example, the switching unit is placed on the ends of any electrical coils, which are thus inserted with their ends into the corresponding receptacles of the switching unit, in particular parallel to the motor axis. Subsequently, the switching unit is suitably rotated parallel to the motor axis, wherein the inserted parts of the stator winding are clamped. At the very least, it is preferable to move the ends of any electrical coils into an area of the receptacles with a reduced diameter, so that stabilization takes place. Furthermore, electrical contacting of the switching unit with the stator winding is carried out, for which purpose in particular any busbars of the switching unit are welded or soldered to the ends of the electrical coils inserted in the receptacles.

In addition, the contact adapter can be connected to the switching unit and electrically contacted by it. Preferably, the contact adapter is attached to the switching unit, especially the contact arms, if any. For example, the contact adapter, i.e., at least part of it, such as the contact arms, is welded or soldered to the switching unit, suitably with a corresponding busbar of the switching unit. In doing so, expediently each busbar is assigned to one of the possible contact arms.

The placement of the switching unit on the stator and the electrical contacting with the stator winding can be carried out in an embodiment before connecting the contact adapter to the switching unit and prior to the electrical contacting herewith. In an alternative, the contact adapter is first connected and electrically contacted by the switching unit, and only after that is the switching unit placed on the stator and electrically contacted by the stator winding.

In a subsequent work step, the stator, to which the switching unit is already attached, to which the contact adapter is connected, is arranged concentrically to the motor axis in the motor housing. Appropriately, the switching unit or the stator has the hole via which positioning takes place inside the motor housing, which is designed in particular in the shape of a pot. For example, the stator is first arranged concentrically to the motor axis within the motor housing and then aligned via the tool. Preferably, however, the stator is arranged in the motor housing via the tool, so that an aligned arrangement takes place in the motor housing. In particular, the motor housing is first heated so that it expands. Subsequently, the stator is aligned in the expanded motor housing, which is then cooled. In this way, the motor housing shrinks so that the stator is safely held in the motor housing. Alternatively or in combination with this, the stator is additionally attached to the motor housing via fasteners and/or an adhesive.

Subsequently, the motor housing can be closed with the bearing plate. In this case, the rotor is held in place on the bearing plate, in particular via the bearing attached to the bearing plate. When the motor housing is closed with the bearing plate, the rotor is arranged concentrically to the motor axis in the motor housing, in particular with the exception of only a part of a possible rotor shaft. For closing, in particular, the bearing plate is moved parallel to the motor axis towards the motor housing and in particular inserted into the opening of the motor housing. In this case, the plug connection is arranged in the opening of the bearing plate. Preferably, when the motor housing is closed with the bearing plate or prior to this, the plug connection is aligned, so that it is always arranged/positioned in the opening of the bearing plate. Particularly preferable, the positioning mechanism is used for this, which, before the motor housing is closed via the bearing plate, is passed through the opening of the bearing plate and is inserted in the plug-in receptacle. In particular, the positioning tool is also used to hold the bearing plate, which is why the number of components required is reduced. After closing the motor housing via the bearing plate, the bearing plate is conveniently attached to the motor housing.

Preferably, the positioner for positioning the plug connection are present inside the opening. In this case, when the plug connection is inserted into the opening, the contact adapter, namely the plug connection, is aligned in a first axial position relative to the bearing plate in a tangential direction relative to the motor axis, wherein in this position the contact adapter, preferably one of the crush ribs, touches the bearing plate. In contrast, at least one of the crush ribs is still spaced from the edge of the opening, for example in an axial direction, i.e., in a direction parallel to the motor axis. In a second axial position relative to the bearing plate, which differs from the first axial position, the contact adapter is aligned in relation to the bearing plate in the radial direction relative to the motor axis, especially when the contact adapter aligned in the tangential direction touches the bearing plate. In the second axial position, in particular, there is mechanical contact between another crush rib and the edge of the opening. In a third axial position, the contact adapter, preferably the plug connection, is radially and/or tangentially aligned in the opening of the bearing plate, in particular symmetrically, preferably in contact with the bearing plate. In the third axial position, mechanical contact of another crush rib with the edge of the opening suitably takes place.

The auxiliary unit is a component of a motor vehicle that is, for example, a utility vehicle, such as a bus or a truck. Particularly preferably, the auxiliary unit, when mounted, is a component of a passenger car. The auxiliary unit is not used directly for propulsion of the motor vehicle, but instead, for example, for the operation of a main drive, the provision of comfort functions and/or the adjustment of a direction of movement of the motor vehicle.

Particularly preferably, the auxiliary unit is a braking force generator. In this case, when the electric motor is operated, the pressure in a brake fluid system is increased in particular via the braking force generator. The brake fluid system comprises, in particular, a pumping chamber of the braking force generator, suitably a balancing chamber and preferably several brake pistons, wherein in particular, at least one brake piston is assigned to each wheel of the motor vehicle. Suitably, each wheel is assigned several brake pistons, which are arranged in particular on a brake caliper.

For example, the braking force generator can be electro-mechanically designed and thus acts in the manner of a brake booster. In this case, a mechanical movement, which is caused in particular by an actuation of a foot pedal by a user, is supported by the braking force generator, so that the force the user needs to apply is reduced. For example, the support is such that the force to be applied is essentially always the same, regardless of the current state of the auxiliary unit. In an alternative, the braking force generator is electro-hydraulically designed. In this case, there is no mechanical coupling with any foot pedal, and the electric motor is operated in particular only via electrical signals generated, for example, via a displacement sensor that is assigned to the foot pedal. Since there is no mechanical coupling with input devices which can be operated by the user, it is possible to operate the braking force generator independently of this, so that it can be used to, at least partially, adopt the function of an anti-lock braking system, an anti-slip control system, an electronic stability control and/or an electromotive-actuated brake force distribution.

At the very least, the auxiliary unit can have an electric motor that has a stator having a stator winding and a rotor as well as a switching unit and a contact adapter for an electrical motor connection. The stator and the rotor are arranged concentrically to a motor axis in a motor housing which is closed with a bearing plate arranged perpendicular to the motor axis. The switching unit is mounted on the stator and is in electrical contact with the stator winding, wherein the contact adapter is connected to the switching unit and in electrical contact with it. A plug connection of the contact adapter is arranged in an opening of the bearing plate.

Furthermore, the invention relates to a motor vehicle with such an auxiliary unit.

The further developments and advantages explained in connection with the electric motor are also to be transferred mutatis mutandis to the method/the auxiliary unit/the motor vehicle as well as to each other, and vice versa.

Further scope of applicability of the present invention will become apparent from the detailed description given hereinafter. However, it should be understood that the detailed description and specific examples, while indicating preferred embodiments of the invention, are given by way of illustration only, since various changes, combinations, and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
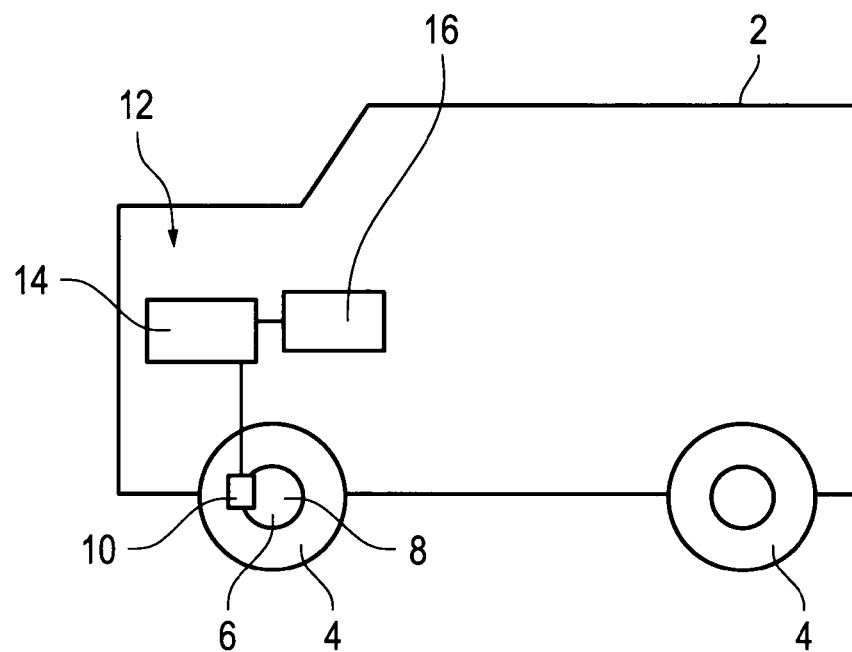
FIG. 1 shows, schematically, a motor vehicle with an electro-hydraulic braking power generator.

FIG. 1 shows a motor vehicle 2 in the form of a passenger car schematically simplified. The motor vehicle 2 has several wheels 4 via which contact is made with an unspecified roadway. Some of the wheels 4 are driven by a main drive, not shown. For braking, the motor vehicle 2 has several brakes 6, only one of which is shown. Each of the brakes 6 comprises a brake disc 8, which is non-rotatably connected to the respective, assigned wheel 4. A brake caliper 10 of the brake 6, which has several brake pistons not shown in detail, is fixed to the body.

The brake pistons are a component of a brake fluid system 12 which has an expansion tank 14 which is fluidly coupled to the brake pistons. Furthermore, an auxiliary unit 16 in the form of an electro-hydraulic braking force generator is coupled to the expansion tank 14. The brake fluid system 12 is filled with a brake fluid and during operation of the (electric/electromotive) auxiliary unit 16, i.e., the electro-hydraulic braking force generator, the pressure in the brake fluid system 12 is increased so that the brake pistons are actuated via the expansion tank 14. Subsequently, brake pads attached to the brake caliper 10 are pressed against the assigned brake disc 8 so that the motor vehicle 2 is braked.

Figure 2:
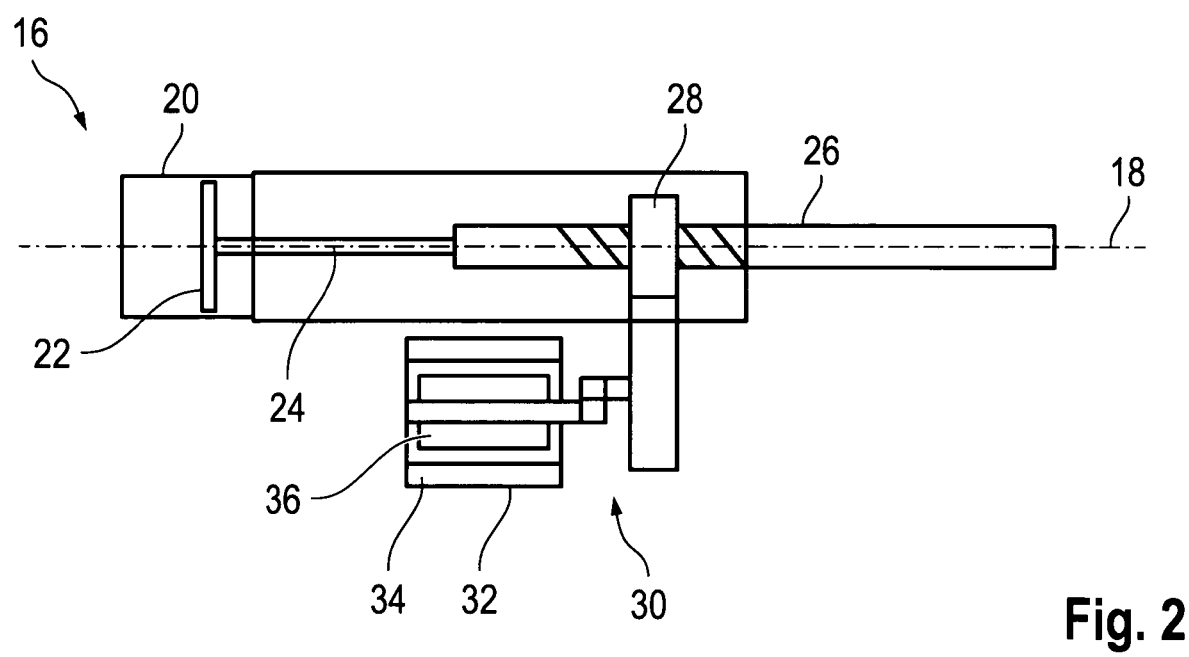
FIG. 2 shows, schematically, in a sectional representation, the electro-hydraulic braking force generator, which comprises an electric motor.

FIG. 2 shows the auxiliary unit 16, i.e., the electrohydraulic braking force generator, in a cross-sectional representation along a longitudinal axis 18. This has a pumping chamber 20 within which a working piston 22 is arranged and guided along the longitudinal axis 18 via the side wall of the pumping chamber 20. The working piston 22 extends to the inner walls of the pumping chamber 20, so that it is divided into two parts via the working piston 22. One of the parts is fluidly connected to the expansion tank 14 via an unspecified outlet and is completely filled with the brake fluid. Thus, when the working piston 22 is moved in the pumping chamber 20, the amount of brake fluid located therein is changed.

The working piston 22 is fastened via a connecting rod 24, which is arranged parallel to the longitudinal axis 18, to an input rod 26, which also extends along the longitudinal axis 18, and which is mounted in a movable manner along the longitudinal axis 18 via an unspecified bearing. In this case the input rod 26 is mounted in a non-rotatable manner, so that rotation of the input rod 26 is avoided.

The input rod 26 is externally toothed, and a drive gear 28 is mounted on it, which in turn is internally toothed. The input rod 26 as well as the drive gear 28 are thus designed in the manner of a spindle. In addition, the drive gear 28 is externally toothed and engages in a gearbox 30. The gearbox 30 is driven by an electric motor 32, which is designed as a brushless direct current motor (BLDC).

When the electric motor 32 is energized, the drive gear 28 is rotated via the gearbox 30. Due to the interlocking with the input rod 26, a force is applied to the input rod 26 along the longitudinal axis 18. Due to the force exerted, the working piston 22 is moved in the pumping chamber 20. As a result, the brake fluid is pushed out of the pump chamber 20. And therefore, the brakes 6 are actuated. In this case, the electric motor 32 is operated when a foot pedal, which is not mechanically coupled to the auxiliary unit 16 and which is not further shown, is actuated by a driver, which is detected via an appropriate sensor. It is also possible to operate the auxiliary unit 16, i.e., the electro-hydraulic braking force generator, completely independently of the actuation of the foot pedal. Consequently, the braking of the motor vehicle 2 is carried out independently of the operation of the foot pedal, for example in the context of emergency braking or in the case of automatic/autonomous operation of the motor vehicle 2.

Figure 3:
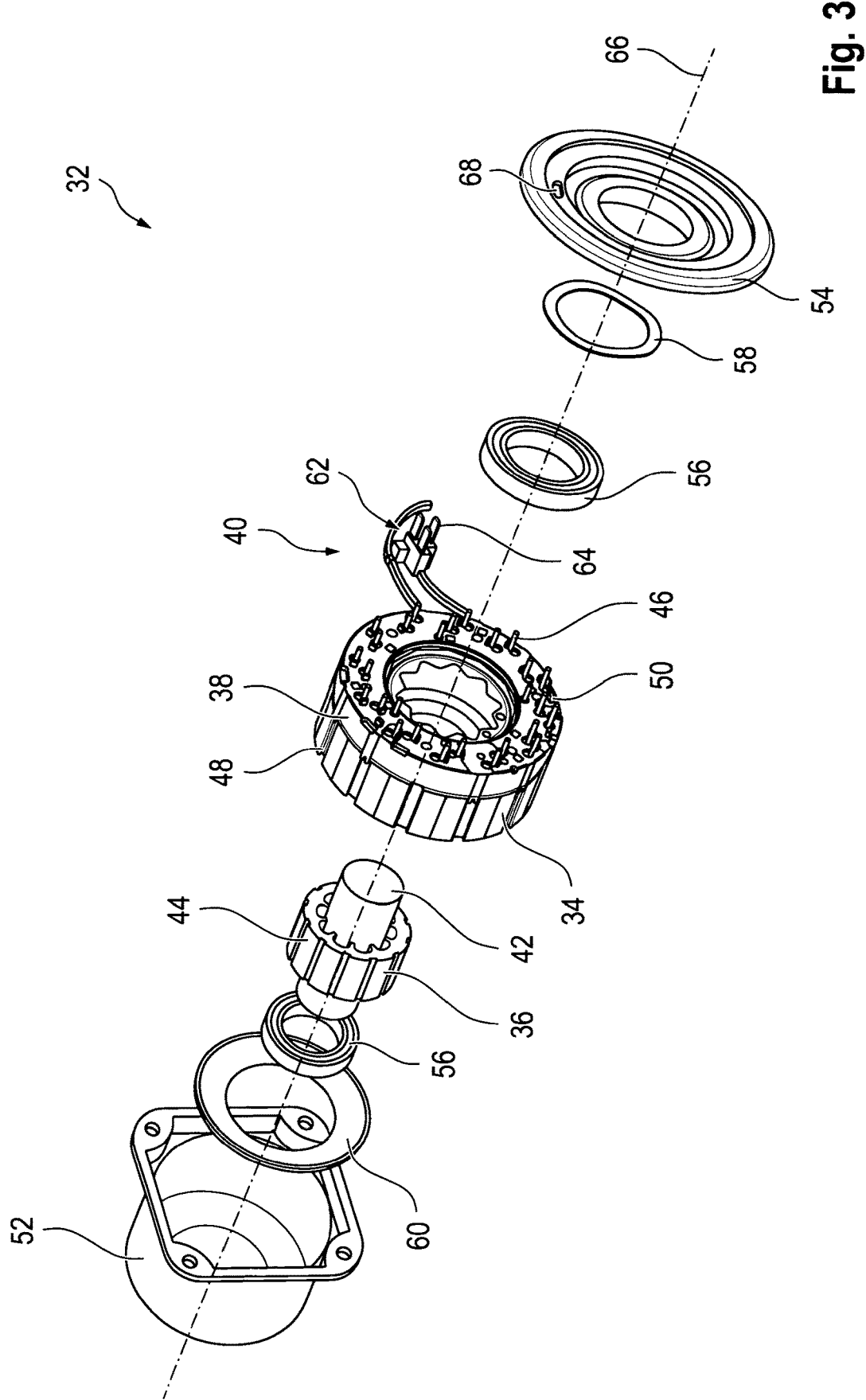
FIG. 3 shows, in an exploded view, the electric motor, which comprises a stator and a rotor as well as a switching unit and a contact adapter.

The electric motor 32 shown in an exploded view in FIG. 3 comprises a stator 34 and a rotor 36 as well as a ring-shaped switching unit 38 and a contact adapter 40. A hollow cylindrical laminate stack of the rotor 36 is fixedly mounted on a motor or rotor shaft 42, which is also hollow cylindrical. A number of permanent magnets 44 are attached to the laminate stack on the circumferential side. The stator 34 of the electronically commutated electric motor 32 carries a stator winding 46 in the form of a number of (electrical) coils 48. These are electrically connected to or with each other via the switching unit 38, for example, by producing (forming) a delta or star circuit. The switching unit 38 has a number of connection contacts or lugs 50, only one of which is designated here for the sake of clarity.

The electric motor 32 also has a pot-shaped motor housing 52 and a bearing plate 54. When the electric motor 32 is mounted, this closes the motor housing 52. Furthermore, in the embodiment example, the electric motor 32 has two bearings 56, namely ball bearings. An annular spring washer 58 is used to generate an adjusting or axial force on the bearing 56 on the bearing plate side. An annular disc 60 arranged on the bottom of the motor housing 52 in the mounted state of the electric motor 32 is used, for example, for the insulation and/or damping of the stator 34 within the motor housing 52.

The contact adapter 40 has a plug connection 62 with male contacts 64. For the three-phase electric motor 32, three plug contacts 64 are provided. The bearing plate 54 has an opening (plug-in opening) 68 radially offset to the outside relative to a motor axis 66, wherein the rotor 36 is rotatably mounted about the motor axis 66 via the bearings 12. When the electric motor 32 is mounted, the plug contacts 64 of the contact adapter 40 penetrate the opening 68 on the bearing plate side. In this case, the plug connection 62 of the contact adapter 40 is inserted in this opening 68 on the bearing plate side.

The plug contacts 64 are held in the mounted state by the corresponding sockets of a motor connection, via which an electrical contact is also made. In this case, the plug connection 62, namely the part passed through this bearing plate 64, is mechanically held in place via the motor connection, so that a stable connection between the plug connection 62 and the motor connection is established. When the electric motor 32 is operated, a current is supplied to the contact adapter 40 via the motor connection, which thus serves as a connection to the electrical motor connection.

Figure 4:
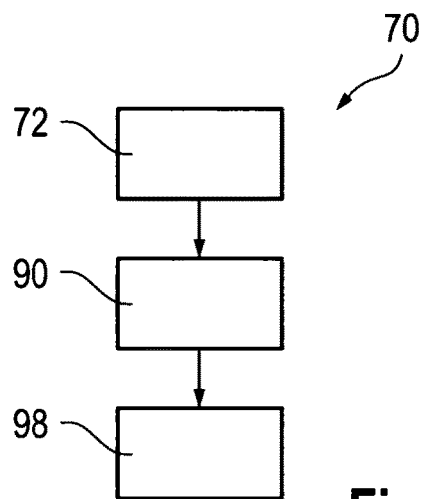
FIG. 4 shows, a method of mounting an electric motor.
Figure 5:
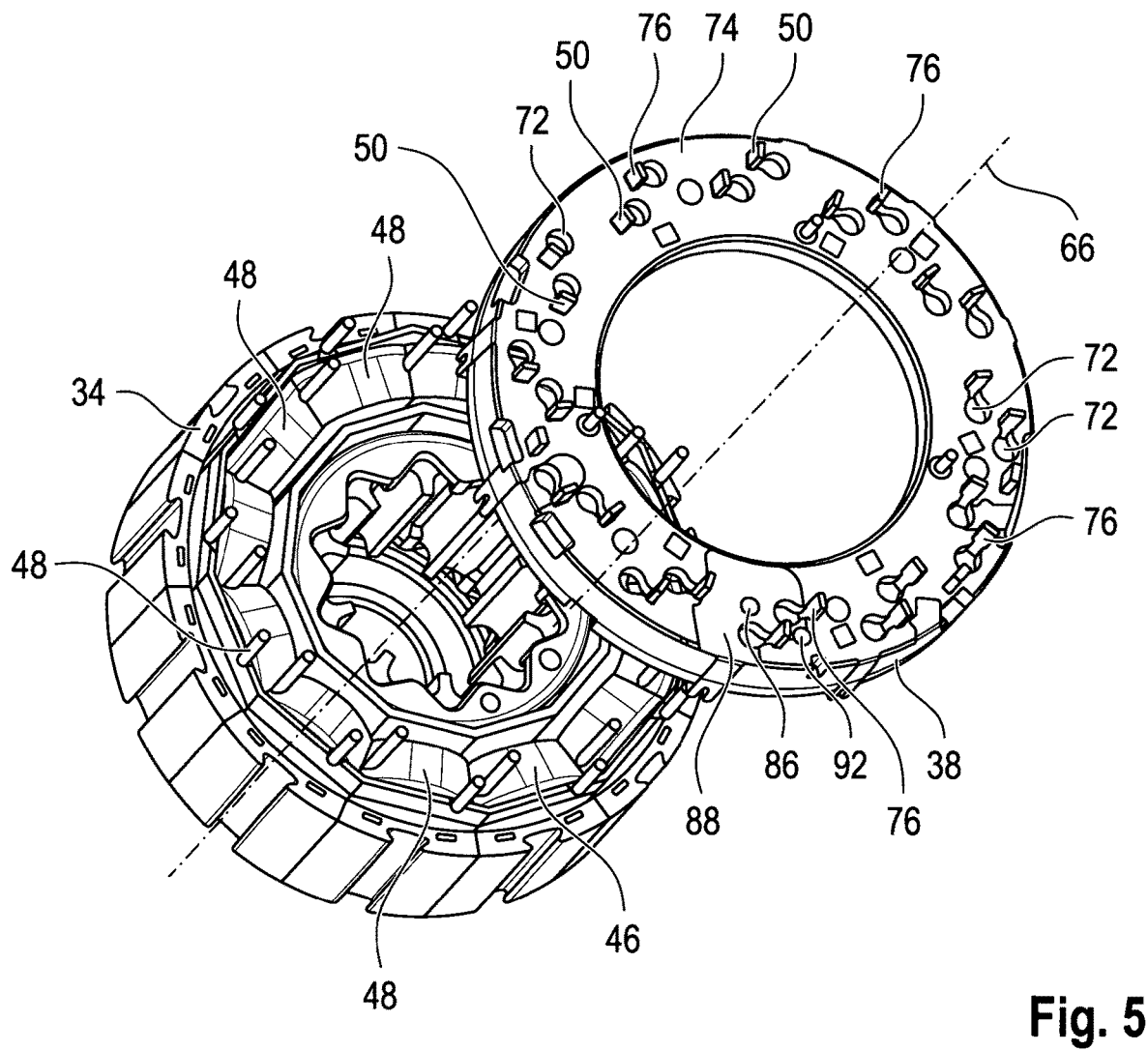
FIG. 5 shows, during the mounting of the electric motor, the stator on which the switching unit is mounted, in perspective.

FIG. 4 shows a method 70 for assembling the electric motor 32. In a first work step 72, the switching unit 38 is placed on one end face of the rotor 34, shown in perspective in FIG. 5, which is hollow cylindrical and concentric to the motor axis 66. For this purpose, the switching unit 38 is moved parallel to the motor axis 66, to which it is also concentrically formed. In doing so, the free ends of each of the electrical coils 48 are passed through corresponding receptacles 72 in a body 74 of the switching unit 38. The body 74 is made of a plastic, and via this several busbars 76 are held, which are made of a copper.

After the switching unit 38 has been placed on the stator 34, the ends of the electrical coils 48 guided through the receptacles 72 are welded or brazed to one of the busbars 76, of which the ends in each case form two of the connection elements 50, each of which is assigned to one of the receptacles 72. In summary, the switching unit 38 is placed on the stator 34 and electrically contacted by the stator winding 46, wherein the switching unit 38 is also held on the stator 34 due to the welding or brazing.

Figure 6:
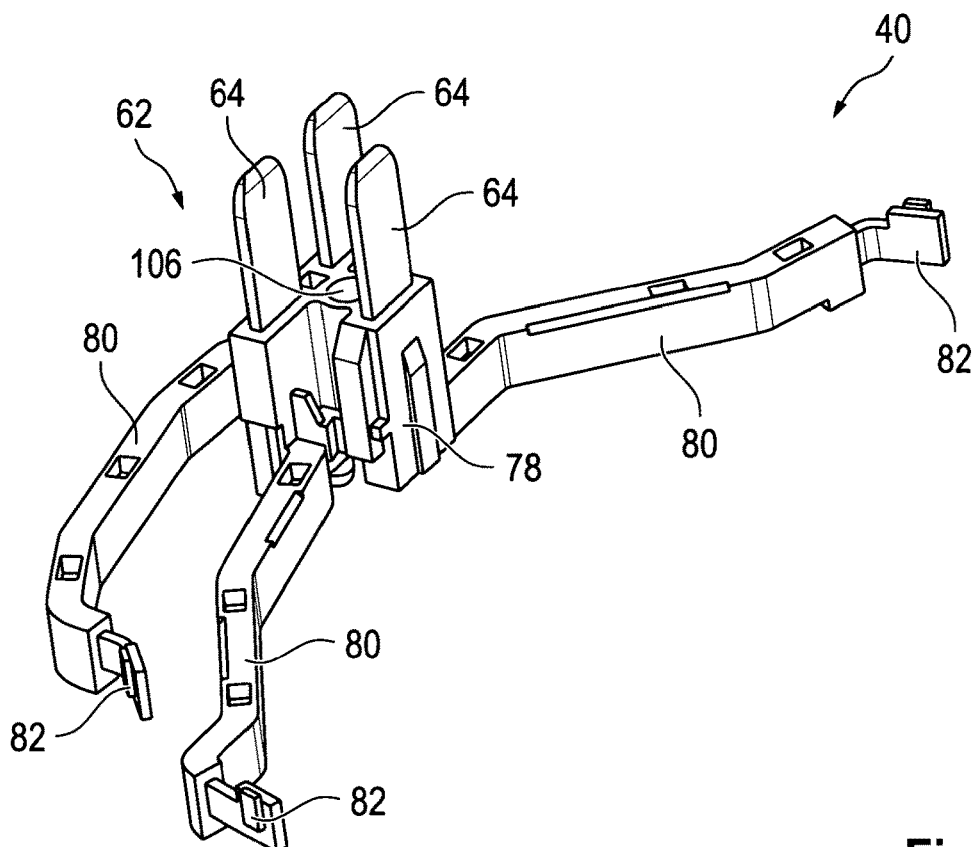
FIGS. 6, 7 show, in each case, the contact adapter, in perspective.
Figure 7:
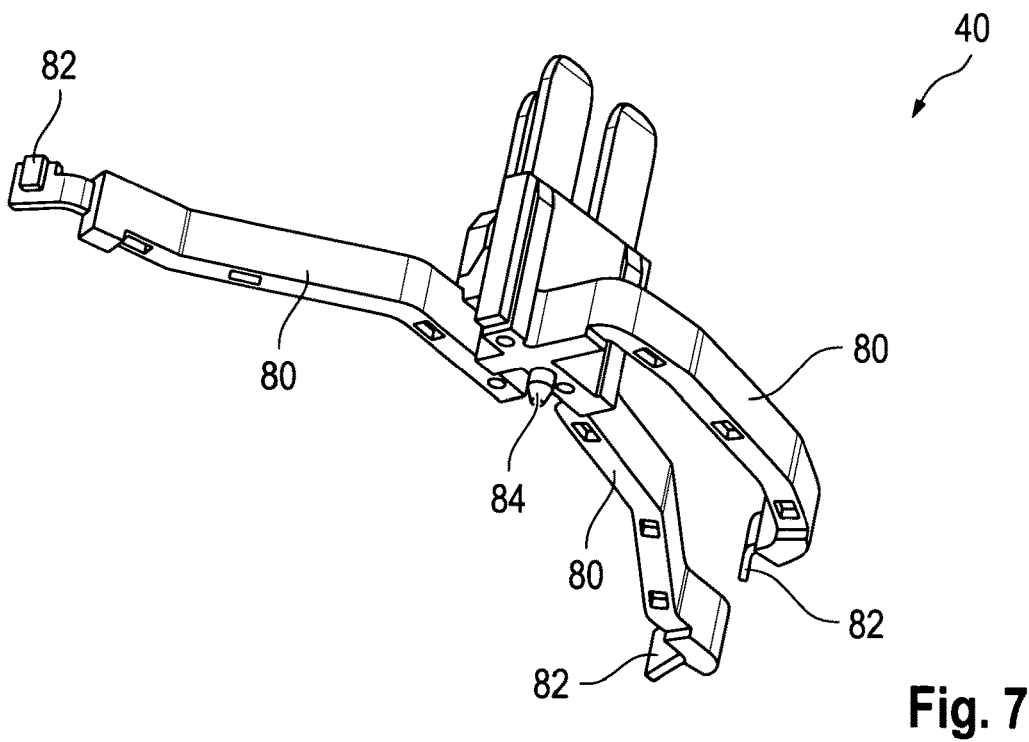

In addition, the contact adapter 40 shown in perspective in FIGS. 6 and 7 is connected to the switching unit 38 and electrically contacted by it. As already explained, the switching unit 40 has the plug connection 62 with the three plug contacts 64, which are made of a copper. These are held in a housing 78 of the plug connection 62, which can be formed of a plastic. During production, the plug contact 64 is overmolded via the plastic. A total of three contact arms 80 are molded to the housing 78 of the plug connection 62, namely an insulation of the respective contact arm 80, which is thus one-piece with the housing 78. Each contact arm 80 has a busbar surrounded by the insulation, which is electrically contacted at one end within the housing 78 with an assigned plug contact 64. The remaining end is led out of the insulation for the formation of a connection lug 82, which thus forms the end of the respective contact arm 80 facing away from the plug connection 62. Between the connection flag 82 and the plug connection 62, each contact arm 80 is arched and materials of each contact arm 80 are selected in such a way that they are flexible and elastic.

Figure 8:
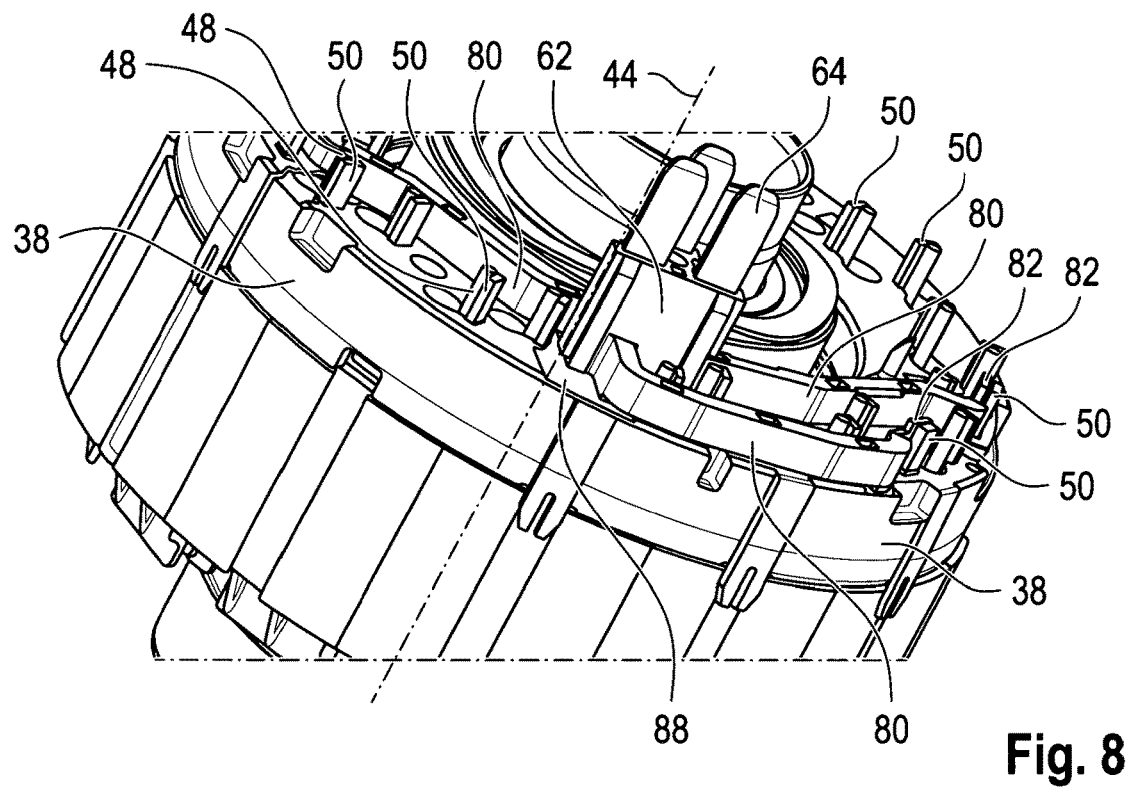
FIGS. 8, 9 show excerpts in perspective or in a cross-sectional representation of the contact adapter connected to the switching unit.

For mounting, a peg 84 of the plug connection 62, which is located on the side opposite the plug contacts 64, is arranged in a hole 86 of the switching unit 38 running parallel to the motor axis 66 with play, which is disposed within a recess 88 of the switching unit 38. In the recess 88, the plug connection 62 with the side opposite the plug contacts 64 is also inserted with play, as sectionally shown in FIG. 8. Each connection lug 82 is connected to one of the connection elements 50 via brazing and thus also electrically contacted. On the other hand, there is no further attachment of the contact adapter 40 to the switching unit 38. Due to the flexible and elastic design of the contact arms, only the connection lugs 82 of the contact adapter 40 are fixed to the switching unit 38.

Figure 9:
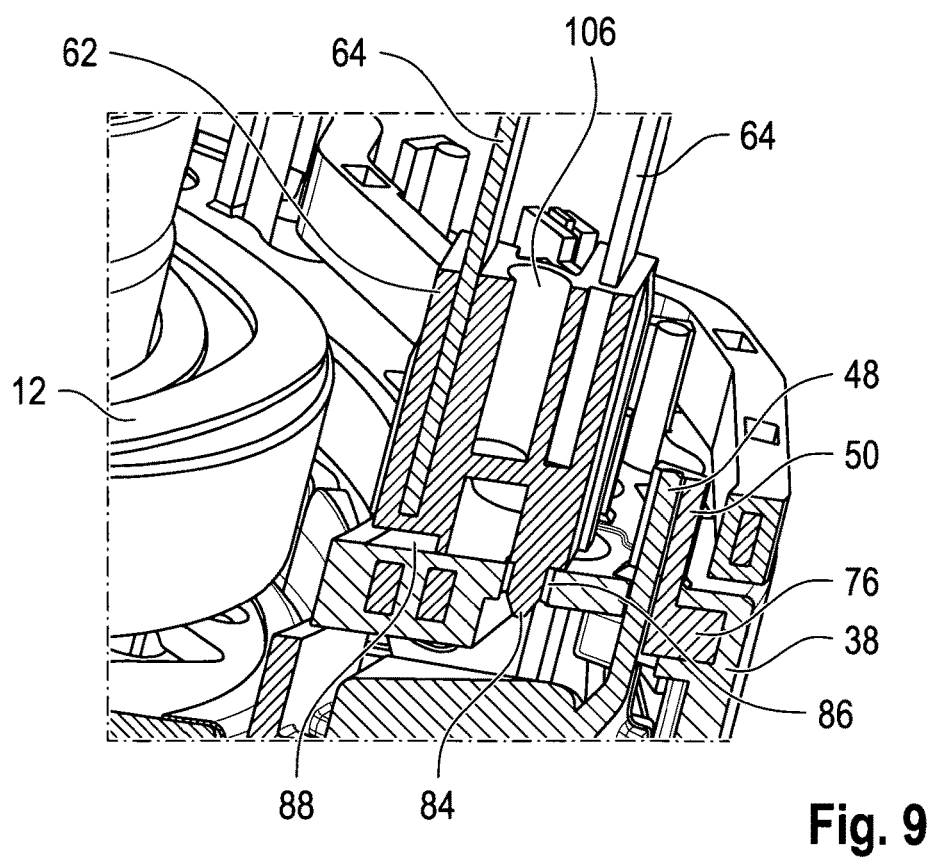

The peg 84 is, as shown in FIG. 9 in a sectional diagram parallel to the motor axis 44, arranged with play within the hole 86 of the switching unit 38 so that a gap or slot is formed between the peg 84 arranged parallel to the motor axis 44 and the edge of the hole 86 running parallel to the motor axis 44. Due to this, as well as to the edge of the recess 88, the plug connection 62 is floatingly mounted on the switching unit 38. Via the recess 88 as well as the hole 86, the amount of the maximum movement of the plug connection 62 perpendicular to the motor axis 44 is specified in relation to the switching unit 38.

Figure 10:
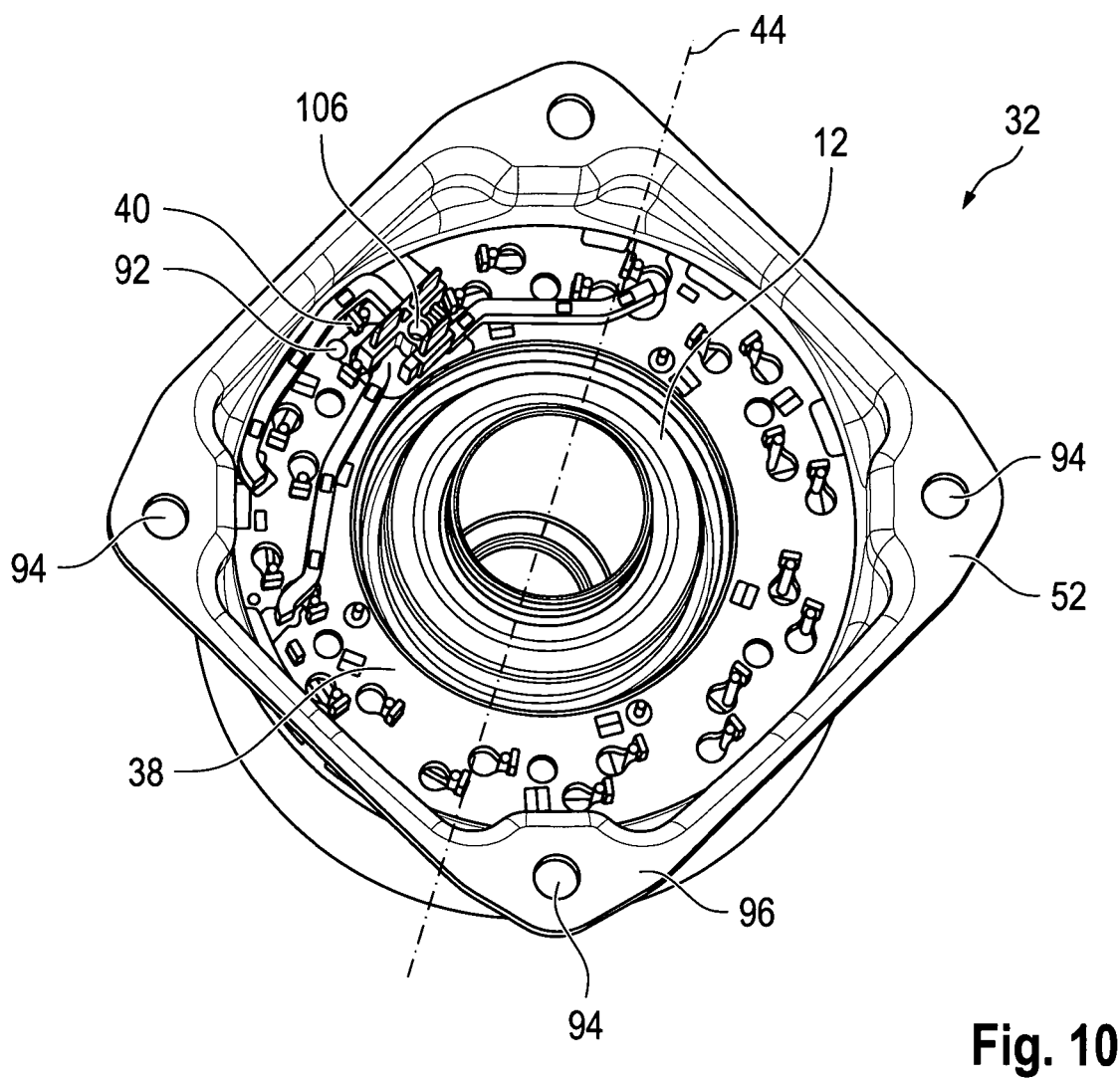
FIG. 10 shows, in perspective, the stator arranged in a motor housing.

In a subsequent second work step 90, the stator 34, to which the switching unit 38 is attached, to which the contact adapter 40 is connected, is arranged concentrically to the motor axis 44 in the motor housing 52, as shown in FIG. 10. There, as in FIGS. 8 and 9, other components of the electric motor 32 are already shown, but these have not yet been mounted at the time of the method 70, such as the bearing 12.

In order to arrange the stator 34 in the motor housing 52, the motor housing 52, which is made of a metal, is heated so that it expands. In said motor housing, the stator 38 with the components attached to it is then arranged concentrically to the motor axis 44 and subsequently cooled. In order to align the stator 34 and the switching unit 38 within the motor housing 52, a mandrel of an unspecified tool is inserted into a hole 92 of the switching unit 38 running parallel to the motor axis 44. The tool has one or more additional mandrels, each of which is inserted into a mounting hole 94 of the motor housing 52, which are inserted in a flange 96 of the motor housing 52 opposite the pot bottom along the motor axis 44. The total of four mounting holes 94 are each used to accommodate a screw, not shown, via which the electric motor 32 can be mounted on other components of the auxiliary unit 16.

Figure 11:
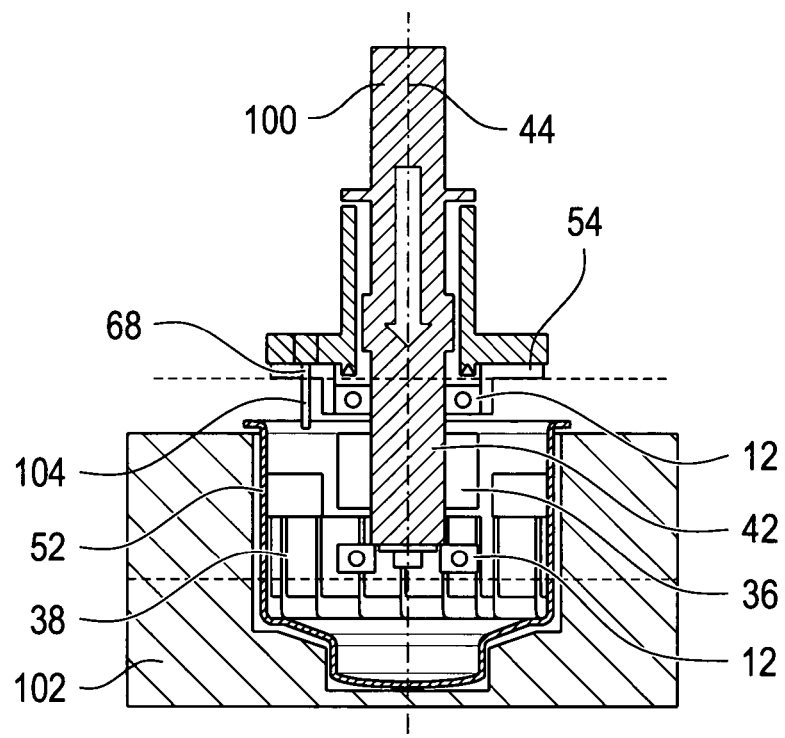
FIGS. 11-16 show, in each case, in a cross-sectional representation, the mounting of a bearing plate on the motor housing via a tool comprising a positioning tool.

In a third work step 98, the motor housing 52 is closed with the bearing plate 54, for which purpose a positioning tool 100, shown in FIG. 11 in a section along the motor axis 44, is used. Via the positioning tool 100, the bearing plate 54 is first held in place, which is aligned perpendicular to the motor axis 44. The assigned bearing 12 is already attached to the bearing plate 54. Furthermore, the motor shaft 42 of the rotor 36 is attached to the bearing 12, to which the laminate stack 36 and the permanent magnets 44 are attached. At the ends of the rotor shaft 42 opposite the bearing plate 54, the remaining bearing 12 is attached. In summary, therefore, the rotor 36 is held on the bearing plate 54, and when the rotor is inserted into the motor housing 52, the rotor 36 is moved concentrically to the motor axis 44 along it into the motor housing 52, so that the rotor 36 is surrounded by the stator 38 on the circumferential side. The motor housing 52 is non-rotatably held inside a bracket 102.

Figure 12:
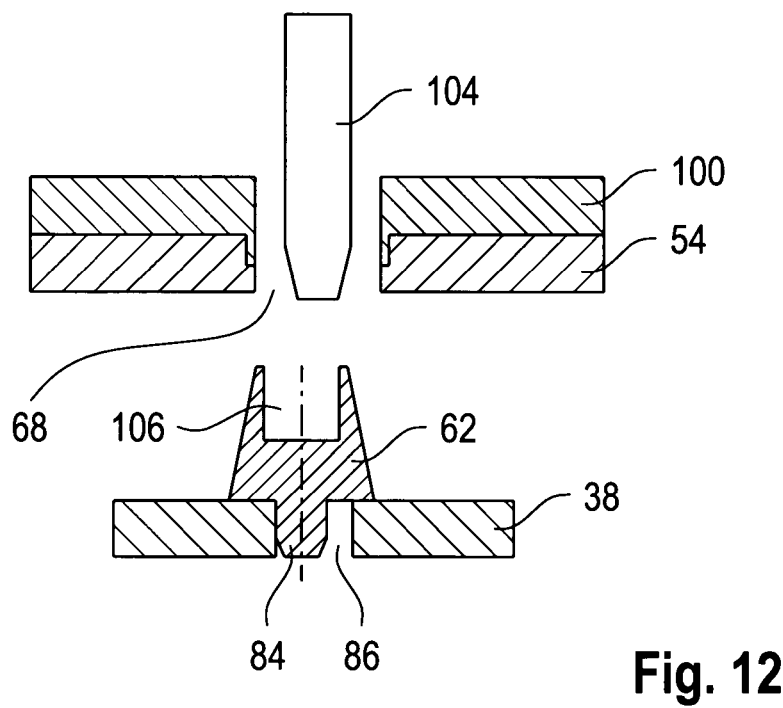

The positioning tool 100 also has a mandrel 104 arranged within the opening 68 of the bearing plate 54. FIG. 12 shows the mandrel 104 in a simplified form, which is arranged parallel to the motor axis 44, and is conical at the free end facing the switching unit 54. In this case, the mandrel 106 is located above, i.e., shifted in a direction parallel to the motor axis 44, the plug connection 62, which is floatingly mounted on the switching unit 38, which has the hole 86, within which the peg 84 of the plug connection 62 is inserted. On the side opposite the peg 84, i.e., on the side facing away from the switching unit 38, the plug connection 62 has a plug-in receptacle 106 running parallel to the motor axis 44, which is designed like a blind hole. The plug-in receptacle 106 is located between the plug contacts 64 and is formed only via the plastic of the plug connection 62.

Figure 13:
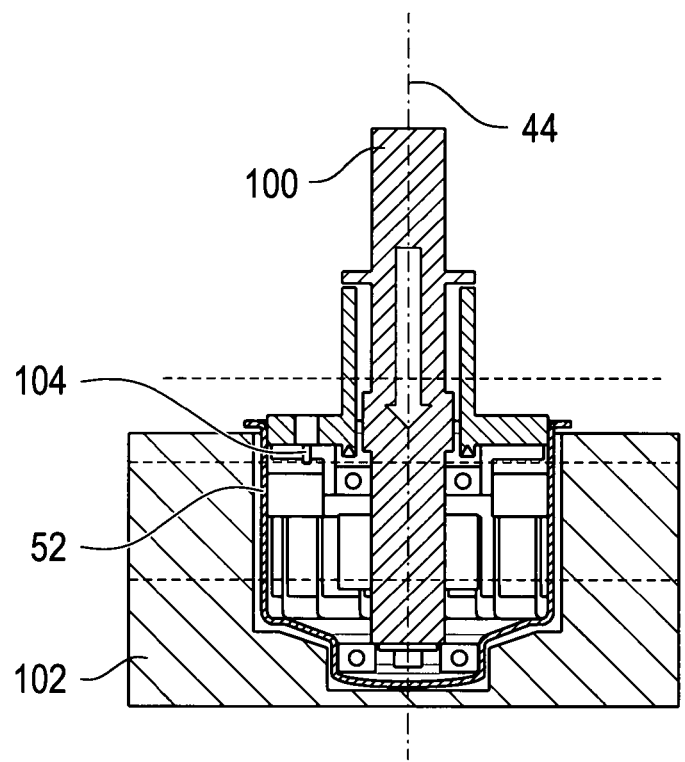
Figure 14:
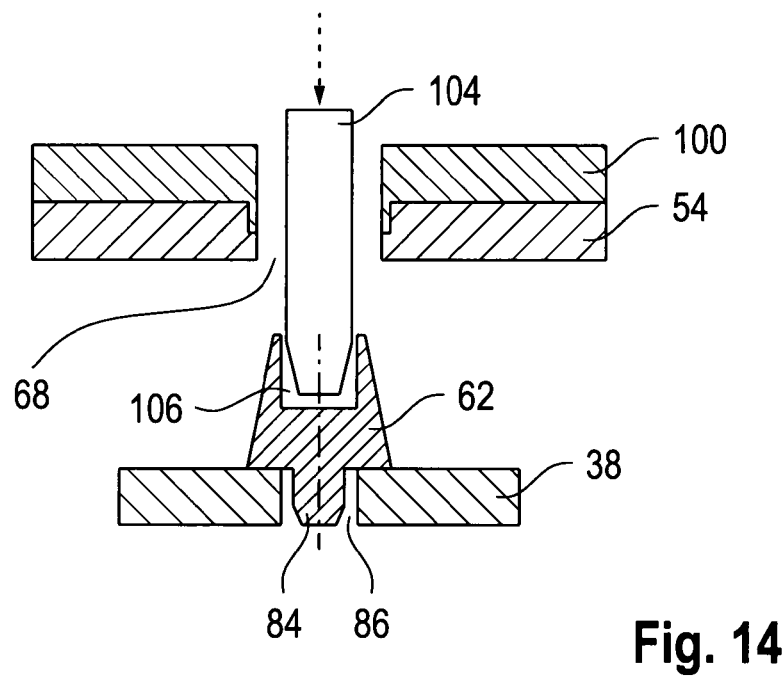
Figure 15:
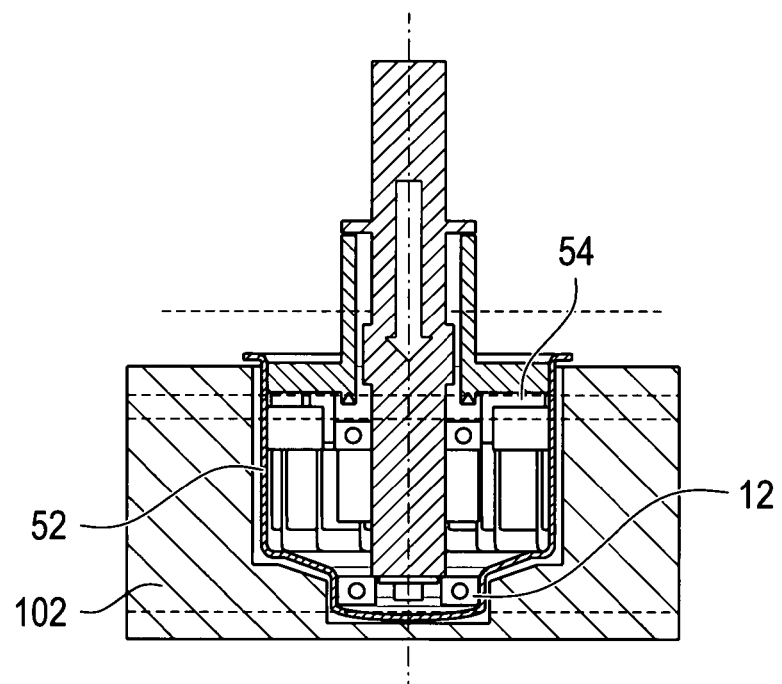
Figure 16:
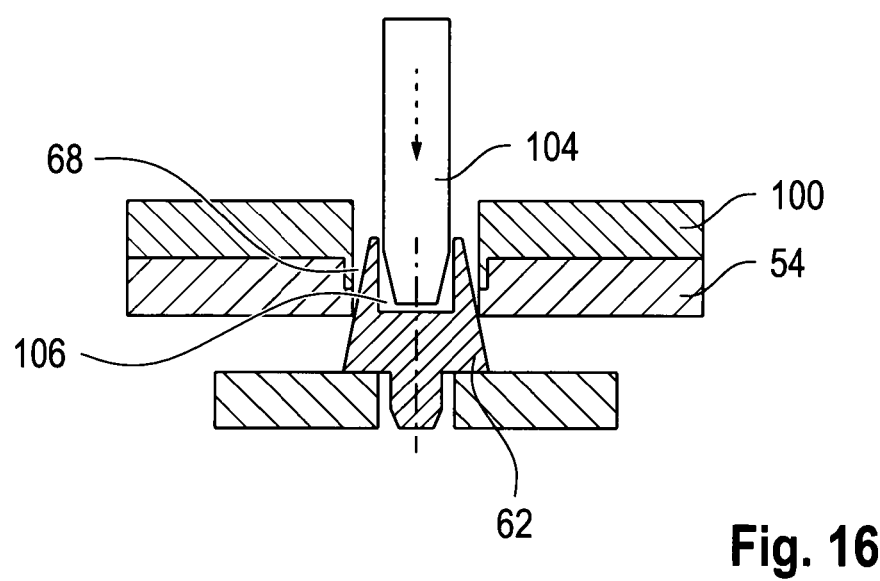

When moving the positioning tool 100 in the direction of the bracket 102, and thus towards the motor housing 52, the mandrel 104 dives into the plug-in receptacle 106 on the free-end side, as shown in FIGS. 13 and 14. For this, the mandrel is 104, for example, additionally shifted parallel to the motor axis 44 relative to the other components of the positioning tool 100. Due to the conical design of the mandrel 104, immersion is possible even with an offset of the plug connection 62. Due to the floating mounting of the plug connection 62 relative to the switching unit 38, the plug connection 62 is offset perpendicular to the motor axis 44 during immersion and thus aligned. In this case, the bearing plate 54 is still spaced from the plug connection 62. The positioning tool 100, namely the mandrel 104, was used for the rough positioning of the plug connection 62 below the opening 68.

On further approach of the positioning tool 100 to the bracket 102, the bearing plate 54 comes into mechanical contact with the motor housing 52, so that the motor housing 52 is closed via the bearing plate 54 arranged perpendicular to the motor axis 44. In doing so, the bearing 12 spaced from the bearing plate 54 reaches a mounting position on the bottom of the pot-shaped motor housing 52 and is attached there via a press fit. Furthermore, the plug connection 62, which has already been roughly positioned via the positioning tool 100, immerses in the opening 68 of the bearing plate 54 and partially penetrates it. As a result, the plug connection 62 of the contact adapter 40 is arranged in the opening 68 of the bearing plate 54 and remains there.

Figure 17:
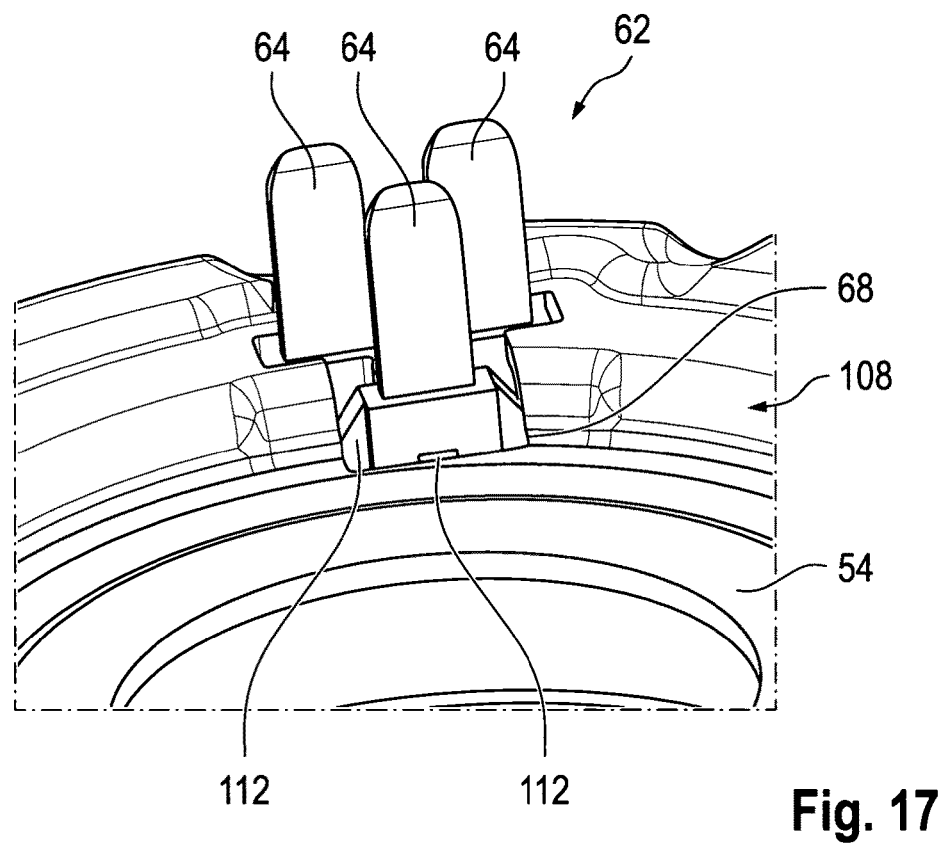
FIG. 17 shows, during the mounting of the electric motor, a plug connection of the contact adapter in perspective, which is disposed in an opening in the bearing plate.
Figure 18:
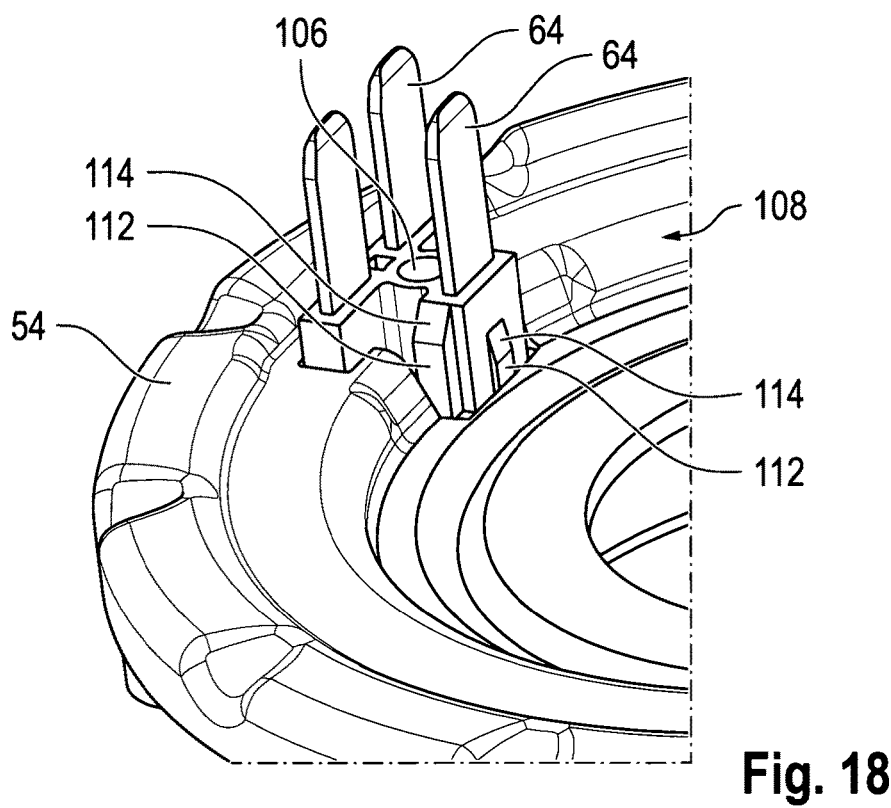
FIGS. 18, 19 show, in each case, in perspective, the plug connection disposed in the opening of the bearing plate.

When the plug connection 62 penetrates the opening 68 of the bearing plate 54, the free ends of the plug connections 64 first pass through the opening, as shown in FIG. 17 in perspective. Subsequently, the plastic part of the plug connection 62 also partially penetrates the opening 68, which is located in the area of a step 180 of the bearing plate 54 and covers it. Via the step 108, the bearing plate 54 is divided into two different ring areas arranged concentrically to the motor axis 44, which are offset relative to the motor axis 44, wherein one of the ring areas surrounds the other.

The contact adapter 40 further include a positioner 110 for positioning the plug connection 62 in the opening 68. The positioner 110 can have several crush ribs 112, which are formed on the outside of the plug connection 62 and are parallel to the motor axis 44. The crush ribs 112 are molded on different sides of the plastic part of the plug connection 62 and have a flattening 114 at each end facing the plug contacts 64, so that insertion into the opening 68 is facilitated. In addition, the crush ribs 112 are designed in such a way that, when the plug connection 62 is inserted into the opening 68 parallel to the motor axis 44, parts thereof successively come into mechanical contact with the edge of the opening 68.

Figure 19:
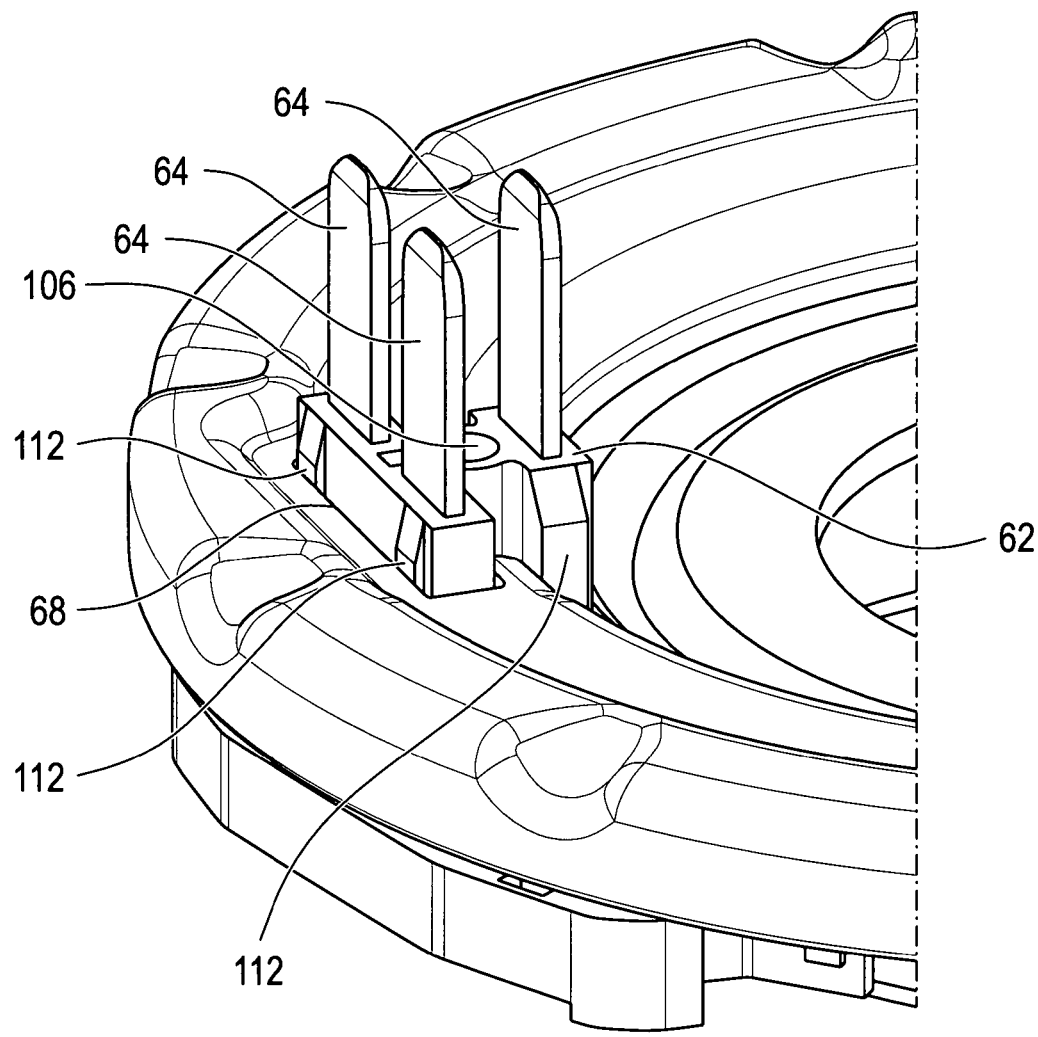

In this case, two of the crush ribs 112 are designed in such a way that they come into mechanical contact with the edge of the opening 68 at the same time, wherein via this an alignment of the plug connection 62 in the tangential direction relative to the motor axis 44 takes place. In FIG. 17, these two crush ribs 112 already protrude through the opening 68. Hereinafter, another of the crush ribs 112, which is already visible in FIG. 17 and which is molded on the side of the plug connection 62 facing the motor axis 44, passes through the opening 68. Via this, a radial alignment of the plug connection 62 is carried out. Subsequently, two of the crush ribs 112 in turn come into mechanical contact with the edge of the opening 68, as shown in FIG. 19. These are located on the side of the plug connection 62 facing away from the motor axis 44. Via these crush ribs 112, both a radial and a tangential alignment of the plug connection 62 within the opening 68 is carried out. In summary, due to the crush ribs 112, the plug connection 62 is aligned differently depending on the axial position of the bearing plate 54 relative to the motor housing 52, wherein in some cases a deformation of the crush ribs 112 occurs. The alignment that is possible due to the floating mounting of the plug connection 62 is a fine positioning in which any remaining offset between the plug connection 62 and the opening 68 is compensated. In summary, the crush ribs 112 are used to fine-position the plug connection 62 in the opening 68, so that the plug connection 64 is in the desired position after completion.

Figure 20:
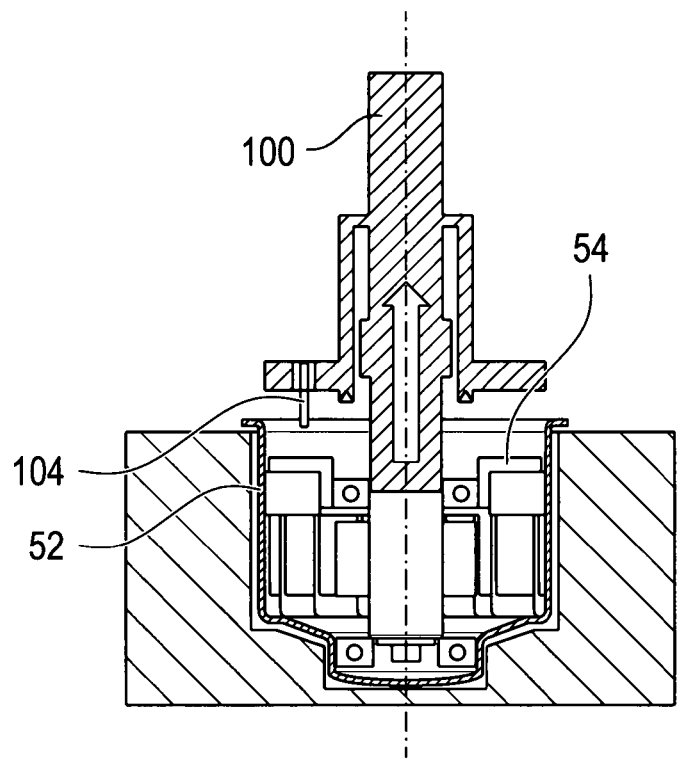
FIGS. 20, 21 show, in each case, the removal of the tool from the electric motor.
Figure 21:
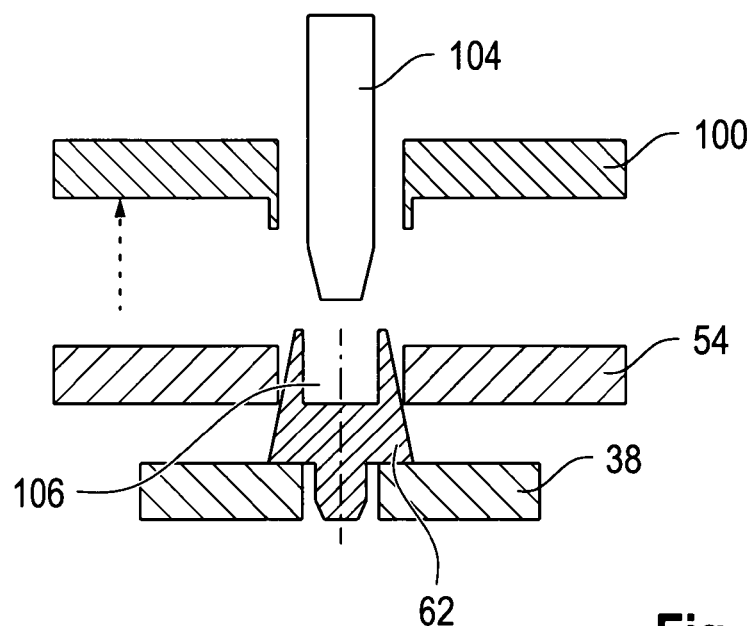

During the successive insertion of the crush ribs 112 into the opening 68, the mandrel 104 is still within the plug-in receptacle 106, so that despite the crush ribs 112 and the force thus exerted on the plug connection 62, tilting of the plug connection 62 is avoided. After the bearing plate 54 rests on the motor housing 52 and is attached thereto, the positioning tool 100 and the mandrel 104 are lifted from the bearing plate 54, which remains attached to the motor housing 52, as shown in FIGS. 20 and 21. In other words, the mandrel 104 of the positioning tool 100 is removed from the plug-in receptacle 106, which consequently only serves to temporarily hold the positioning tool 100.

Figure 22:
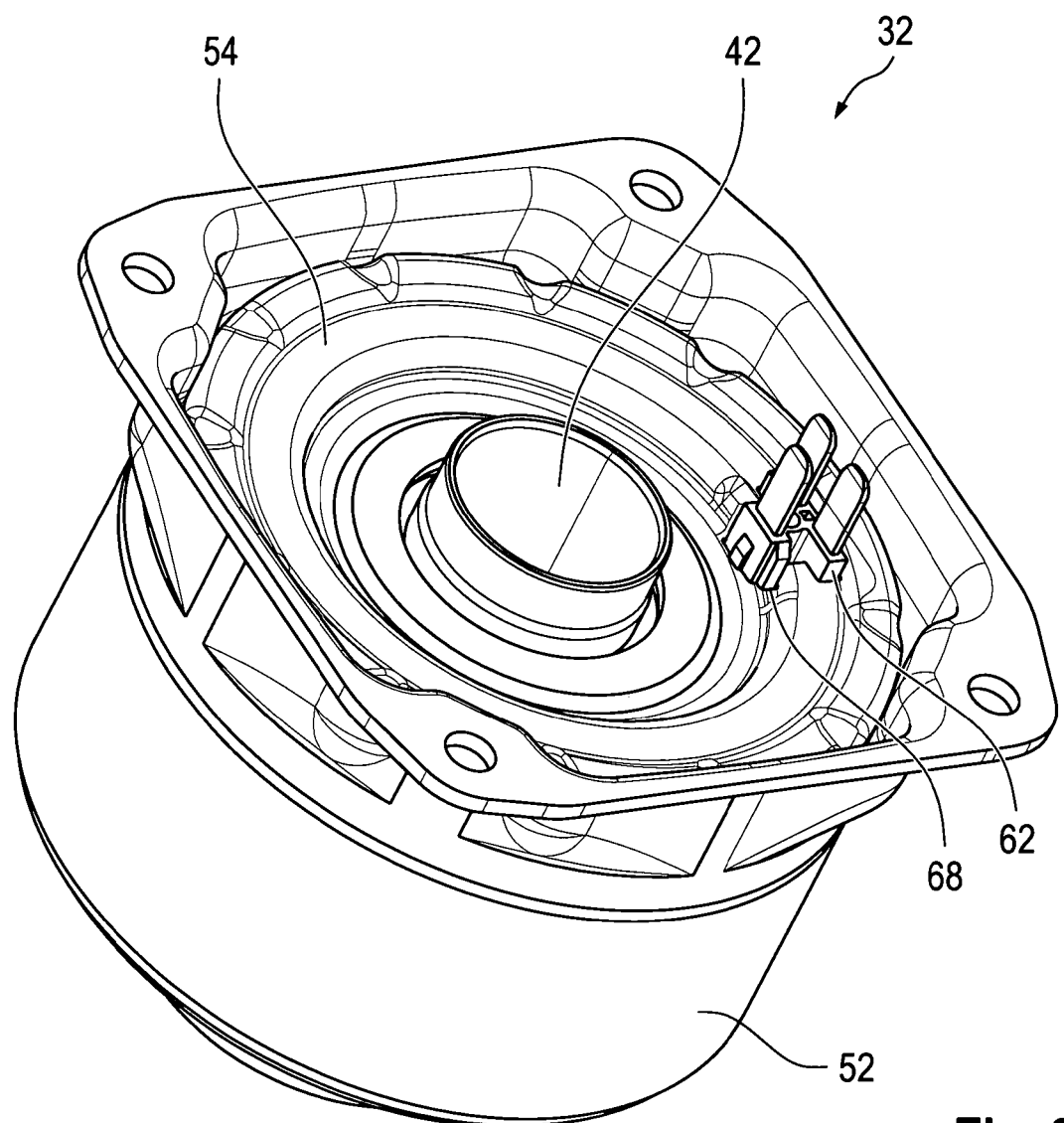
FIG. 22 shows, in perspective, the mounted electric motor.

Subsequently, the creation of the electric motor 32 is completed, which is shown in perspective in FIG. 22. Here, the motor housing 52 is closed via the bearing plate 54, and the plug connection 62 of the contact adapter 40 protrudes through the opening 68, so that the motor connection can be plugged in despite the motor housing 52 being closed.

The invention is not limited to the embodiment described above. Rather, other variants of the invention can be derived by those skilled in the art, without departing the subject matter of the invention. In particular, all the individual features described in connection with the embodiment example can also be combined in other ways without departing from the subject-matter of the invention.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. An electric motor of a motor vehicle, the electric motor comprising:
   a stator having a stator winding;
   a rotor, the stator and the rotor being arranged concentrically to a motor axis in a motor housing, which is connected to a bearing plate that is disposed substantially perpendicular to the motor axis;
   a switching unit mounted on the stator and in electrical contact with the stator winding;
   a contact adapter for an electrical motor connection, the contact adapter being connectable to the switching unit and in electrical contact with the switching unit; and
   a plug connection of the contact adapter being arranged in an opening of the bearing plate,
   wherein the plug connection is floatingly mounted on the switching unit, and
   wherein the plug connection has a peg running parallel to the motor axis, which is inserted with play inside a hole of the switching unit.

2. The electric motor according to claim 1, wherein the switching unit has a recess within which the plug connection is arranged with play.

3. The electric motor according to claim 1, wherein a flexible and/or elastic contact arm is connected to the plug connection, which is attached to the switching unit.

4. The electric motor according to claim 1, wherein the contact adapter has a positioner to position the plug connection in the opening.

5. The electric motor according to claim 4, wherein the positioner comprises crush ribs molded on an outside of the plug connection and running parallel to the motor axis, such that when the plug connection is inserted into the opening parallel to the motor axis, the crush ribs successively come into mechanical contact with the edge of the opening.

6. The electric motor according to claim 4, wherein on a side facing away from the switching unit, the plug connection has a plug-in receptacle running substantially parallel to the motor axis for a temporary reception of a positioning tool.

7. A method for mounting the electric motor according to claim 1, the method comprising:
   placing the switching unit on the stator to thereby be electrically contacted by the stator winding;
   connecting the contact adapter to the switching unit such that the contact adapter is in electrical contact with the switching unit;
   arranging the stator concentrically to the motor axis in the motor housing; and
   closing the motor housing with the bearing plate on which the rotor is held,
   wherein the rotor is arranged concentrically to the motor axis in the motor housing,
   wherein the plug connection is arranged in the opening of the bearing plate,
   wherein the plug connection is floatingly mounted on the switching unit, and
   wherein the plug connection has the peg running parallel to the motor axis, which is inserted with play inside the hole of the switching unit.

8. An electric motor of a motor vehicle, the electric motor comprising:
   a stator having a stator winding;
   a rotor, the stator and the rotor being arranged concentrically to a motor axis in a motor housing, which is connected to a bearing plate that is disposed substantially perpendicular to the motor axis;
   a switching unit mounted on the stator and in electrical contact with the stator winding;
   a contact adapter for an electrical motor connection, the contact adapter being connectable to the switching unit and in electrical contact with the switching unit; and
   a plug connection of the contact adapter being arranged in an opening of the bearing plate,
   wherein the plug connection is floatingly mounted on the switching unit,
   wherein a flexible and/or elastic contact arm is connected to the plug connection, which is attached to the switching unit, and
   wherein at an end facing away from the plug connection, the contact arm has a connection lug for contacting, which contacts a corresponding connection element of the switching unit via brazing.

9. An auxiliary unit of a motor vehicle, comprising an electric motor, the electric motor comprising:
   a stator having a stator winding;
   a rotor, the stator and the rotor being arranged concentrically to a motor axis in a motor housing, which is connected to a bearing plate that is disposed substantially perpendicular to the motor axis;
   a switching unit mounted on the stator and in electrical contact with the stator winding;
   a contact adapter for an electrical motor connection, the contact adapter being connectable to the switching unit and in electrical contact with the switching unit; and
   a plug connection of the contact adapter being arranged in an opening of the bearing plate,
   wherein the plug connection is floatingly mounted on the switching unit, and
   wherein the plug connection has a peg running parallel to the motor axis, which is inserted with play inside a hole of the switching unit.

10. A method for mounting the electric motor according to claim 8, the method comprising:
    placing the switching unit on the stator to thereby be electrically contacted by the stator winding;
    connecting the contact adapter to the switching unit such that the contact adapter is in electrical contact with the switching unit;
    arranging the stator concentrically to the motor axis in the motor housing; and
    closing the motor housing with the bearing plate on which the rotor is held,
    wherein the rotor is arranged concentrically to the motor axis in the motor housing,
    wherein the plug connection is arranged in the opening of the bearing plate,
    wherein the plug connection is floatingly mounted on the switching unit,
    wherein the flexible and/or elastic contact arm is connected to the plug connection, which is attached to the switching unit, and
    wherein at the end facing away from the plug connection, the contact arm has the connection lug for contacting, which contacts the corresponding connection element of the switching unit via brazing.

* * * * *